(12) United States Patent
Quan et al.

(10) Patent No.: US 10,477,446 B2
(45) Date of Patent: Nov. 12, 2019

(54) INTERFERENCE CANCELLATION METHOD AND DEVICE

(71) Applicant: HUAWEI TECHNOLOGIES CO., LTD., Shenzhen (CN)

(72) Inventors: Wei Quan, Beijing (CN); Xiaodong Yang, Shenzhen (CN); Jian Zhang, Beijing (CN); BingZhao Li, Beijing (CN); Zhenxing Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 15/425,245

(22) Filed: Feb. 6, 2017

(65) Prior Publication Data

US 2017/0150414 A1 May 25, 2017

Related U.S. Application Data

(63) Continuation of application No. PCT/CN2014/083925, filed on Aug. 7, 2014.

(51) Int. Cl.
*H04W 36/20* (2009.01)
*H04W 72/08* (2009.01)

(52) U.S. Cl.
CPC ......... *H04W 36/20* (2013.01); *H04W 72/082* (2013.01)

(58) Field of Classification Search
CPC .... H04W 72/082; H04W 36/20; H04W 72/08
(Continued)

(56) References Cited

U.S. PATENT DOCUMENTS 5,740,208 A * 4/1998 Hulbert ............... H04B 7/022
375/346
5,862,124 A * 1/1999 Hottinen ............ H04B 1/7103
370/335
(Continued)

FOREIGN PATENT DOCUMENTS

CN 102685826 A 9/2012
CN 103581073 A 2/2014
(Continued)

OTHER PUBLICATIONS

Japanese Notice of Allowance dated Jul. 24, 2018, in corresponding Japanese Patent Application No. 2017-506720, 3 pgs.
(Continued)

*Primary Examiner* — Man U Phan
(74) *Attorney, Agent, or Firm* — Staas & Halsey LLP

(57) ABSTRACT

An interference cancellation method and device are disclosed. In a process of performing cell reestablishment or cell handover, for any interference cancellation parameter previously received from a network-side device, a user terminal can continue to apply the interference cancellation parameter to perform an interference cancellation operation according to a specified first interference cancellation parameter application rule or first instruction information delivered by the network-side device, or release or no longer apply the interference cancellation parameter. In this way, a currently existing problem that a user terminal cannot know how to process a previously received interference cancellation parameter in a process of performing cell reestablishment or cell handover can be resolved, and further, an objective of improving an interference cancellation effect can be achieved.

16 Claims, 3 Drawing Sheets

---

101

A user terminal receives an interference cancellation parameter delivered by a network-side device, and applies the received interference cancellation parameter to perform an interference cancellation operation

102

In a process of performing cell reestablishment or cell handover, for any received interference cancellation parameter, continue to apply the interference cancellation parameter to perform an interference cancellation operation according to a specified first interference cancellation parameter application rule or first instruction information delivered by the network-side device, or release or no longer apply the interference cancellation parameter

(58) Field of Classification Search
USPC .................................................. 370/329, 332
See application file for complete search history.

(56) References Cited

U.S. PATENT DOCUMENTS

| | | | | |
|---|---|---|---|---|
| 7,856,243 | B2* | 12/2010 | Gunnarsson | H04W 52/241 455/127.1 |
| 7,860,502 | B2* | 12/2010 | Kim | H04B 1/7105 370/310 |
| 8,284,819 | B2* | 10/2012 | Hahm | H04B 1/712 375/148 |
| 8,358,610 | B2* | 1/2013 | Luo | H04B 1/7107 370/317 |
| 8,412,103 | B2* | 4/2013 | Srinivasan | H04W 16/08 370/330 |
| 8,509,698 | B2* | 8/2013 | Hahm | H04B 1/71075 455/114.1 |
| 8,670,509 | B2* | 3/2014 | Sollenberger | H04W 36/18 329/320 |
| 8,681,687 | B2* | 3/2014 | Luo | H04B 1/7107 370/317 |
| 9,197,344 | B2* | 11/2015 | Cyzs | H04B 17/345 |
| 9,210,605 | B2* | 12/2015 | Yoo | H04L 1/0026 |
| 9,986,572 | B2* | 5/2018 | Kim | H04W 24/10 |
| 2010/0009705 | A1* | 1/2010 | Budianu | H04L 1/1812 455/501 |
| 2011/0275394 | A1 | 11/2011 | Song et al. | |
| 2012/0069756 | A1 | 3/2012 | Ji et al. | |
| 2012/0224499 | A1* | 9/2012 | Yoo | H04J 11/005 370/252 |
| 2014/0018082 | A1 | 1/2014 | Cheng et al. | |
| 2014/0018090 | A1* | 1/2014 | Khoryaev | H04W 52/04 455/452.1 |
| 2014/0242995 | A1 | 8/2014 | Lee et al. | |
| 2014/0362766 | A1* | 12/2014 | Strait | H04L 25/03006 370/328 |
| 2014/0362942 | A1* | 12/2014 | Wood | H04B 15/00 375/267 |

FOREIGN PATENT DOCUMENTS

| | | |
|---|---|---|
| EP | 1796414 A1 | 6/2007 |
| EP | 2675212 A1 | 12/2013 |
| JP | 2013-526154 A | 6/2013 |
| JP | 2015-513274 | 4/2015 |
| WO | 2010/039359 A2 | 4/2010 |
| WO | 2012/136286 A1 | 10/2012 |
| WO | 2013/055173 A2 | 4/2013 |
| WO | 2013/138996 A1 | 9/2013 |

OTHER PUBLICATIONS

Alcatel-Lucent, "Signaling design for neighbouring cell CRS information," 3GPP TSG-RAN WG2 Meeting #78, May 21-25, 2012, R2-122595, 3 pgs.
Japanese Office Action dated Mar. 20, 2018, in corresponding Japanese Patent Application No. 2017-506720, 9 pgs.
Nokia Siemens Networks, Nokia Corporation, "Network assistance for Crs Interference Cancellation," 3GPP TSG-RAN WG2, Meeting #77bis, Agenda item: 7.5, Jeju, South Korea, Mar. 26-30, 2012, R2-121617, XP050606375, 3 pgs.
European Office Action dated Jun. 8, 2018, in corresponding European Patent Application No. 14 899 510.3, 10 pgs.
Extended European Search Report dated Jul. 7, 2017 in corresponding European Patent Application No. 14899510.3.
Texas Instruments: "Support for Cell Detection and Rate-Matching for Co-channel Het-Nets in Rel-11," 3GPP Draft; R1-120465, $3^{rd}$ Generation Partnership Project (3GPP), Mobile Competence Centre; 650, Route Des Lucioles; F-06921 Sophia-Antipolis Cedex; France, vol. RAN WG1, No. Dresden, Germany, Jan. 31, 2012, XP050562951.
Samsung: "RRC signaling support for CRS interference handling," 3GPP Draft, R2-122502, $3^{rd}$ Generation Partnership Project (3GPP), Mobile Competence Center; 650, Route Des Lucioles; F-06921 Sophia-Antipolis Cedex; France, vol. RAN WG2, No. Prague, Czech Republic, May 14, 2012, XP050606954.
International Search Report dated May 6, 2015 in corresponding International Patent Application No. PCT/CN2014/083925.
International Search Report dated May 6, 2015 in corresponding Application No. PCT/CN2014/083925.

\* cited by examiner

INTERFERENCE CANCELLATION METHOD AND DEVICE

CROSS-REFERENCE TO RELATED APPLICATIONS

This application is a continuation of International Application No. PCT/CN2014/083925, filed on Aug. 7, 2014, the disclosure of which is hereby incorporated by reference in its entirety.

TECHNICAL FIELD

The present disclosure relates to the field of communications technologies, and in particular, to an interference cancellation method and device.

BACKGROUND

In an LTE (Long Term Evolution) system and an LTE-A (Long Term Evolution-Advanced) system, a phenomenon of intra-frequency networking usually occurs. In this case, downlink interference may exist between neighboring cells in a system. In particular, in a heterogeneous network and a small-cell network, this problem may be severer. Specifically, when downlink interference exists on a PDSCH (Physical Downlink Shared Channel), downlink throughputs of a user terminal and a system are severely affected.

Specifically, the following manners are generally used in the industry currently to resolve the foregoing downlink interference problem.

Manner 1: An ABS (Almost Blank Subframe) manner is used to reduce downlink interference. Specifically, a network-side device such as a base station may set some time periods of a cell, for example, a subframe, as an ABS subframe. In a position of the ABS subframe, the cell basically does not transmit any downlink signal, so that interference caused in the position of the ABS subframe by the cell to a neighboring cell is greatly reduced, and that an effect of increasing a downlink throughput of the neighboring cell may be achieved.

Manner 2: A network-side device such as a base station may transmit an interference cancellation parameter such as a CRS (Cell-specific Reference Signal)-related parameter and/or a PDSCH-related parameter of a neighboring cell to a user terminal, so that the user terminal cancels, according to the interference cancellation parameter, interference caused by the CRS-related parameter and/or PDSCH-related parameter of the neighboring cell to downlink data.

However, when the manner 1 is used to cancel downlink interference, a specified cell basically does not transmit any downlink signal in some time periods, that is, the manner 1 is to obtain relatively weak downlink interference by sacrificing some communication resources of the specified cell, and therefore, utilization of downlink spectrum resources of the specified cell is reduced to some extent. When the manner 2 is used to cancel downlink interference, an interference cancellation effect of the user terminal may be impaired because currently there is no specification on how the user terminal should process a previously received interference cancellation parameter when the user terminal needs to perform an operation such as cell reestablishment or cell handover due to radio link failure or handover of the user terminal.

That is, when the existing interference cancellation manners are used to perform interference cancellation, an interference cancellation effect achieved is poor. Therefore, it is urgent to provide a new interference cancellation manner to resolve the foregoing problems.

SUMMARY

Embodiments of the present invention provide an interference cancellation method and device to resolve a currently existing problem that an achieved interference cancellation effect is poor when an existing interference cancellation manner is used to perform interference cancellation.

According to a first aspect, a user terminal is provided and includes:

a receiving module, configured to receive an interference cancellation parameter delivered by a network-side device, or further configured to receive first instruction information delivered by a network-side device; and a processing module, configured to apply the interference cancellation parameter received by the receiving module, to perform an interference cancellation operation, and in a process of performing cell reestablishment or cell handover, for any received interference cancellation parameter, continue to apply the interference cancellation parameter to perform an interference cancellation operation according to a specified first interference cancellation parameter application rule or the first instruction information received by the receiving module, or release or no longer apply the interference cancellation parameter.

With reference to the first aspect, in a first possible implementation manner of the first aspect, the interference cancellation parameter received by the receiving module includes at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN (Multicast Broadcast Single Frequency Network) configuration information of a neighboring cell of a serving cell in which the user terminal is located, information about a virtual cell ID (namely, a virtual cell identity) and an nSCID (namely, a scrambling identifier indication bit) of a neighboring cell of a serving cell in which the user terminal is located, a TDD (time division duplex) configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

With reference to the first aspect or the first possible implementation manner of the first aspect, in a second possible implementation manner of the first aspect, the first interference cancellation parameter application rule is transmitted by the network-side device to the user terminal.

With reference to the first aspect, or the first or the second possible implementation manner of the first aspect, in a third possible implementation manner of the first aspect, the first interference cancellation parameter application rule includes any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation; and the processing module is specifically configured to: in the process of performing cell reestablishment or cell handover, continue to apply the received interference cancellation parameter to perform the interference cancellation operation; or specifically configured to, in the process of performing cell reestablishment or cell handover, if it is determined that reestablishment or handover to the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the target serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continue to apply the interference cancellation parameter to perform the interference cancellation operation, or else, release or no longer apply the interference cancellation parameter.

With reference to any one of the first aspect, or the first to the third possible implementation manners of the first aspect, in a fourth possible implementation manner of the first aspect, the first instruction information includes instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover; and the processing module is specifically configured to: in the process of performing cell reestablishment or cell handover, for the any received interference cancellation parameter, if it is determined that instruction information delivered by the network-side device and used to instruct the user terminal to continue to apply the interference cancellation parameter in the process of performing cell reestablishment or cell handover is received, continue to apply the interference cancellation parameter to perform the interference cancellation operation; or if it is determined that instruction information delivered by the network-side device and used to instruct the user terminal to release or no longer apply the interference cancellation parameter in the process of performing cell reestablishment or cell handover is received, release or no longer apply the interference cancellation parameter.

With reference to the third possible implementation manner of the first aspect, in a fifth possible implementation manner of the first aspect, for the any received interference cancellation parameter, the effective duration of the interference cancellation parameter is transmitted by the network-side device to the user terminal.

With reference to the third or the fifth possible implementation manner of the first aspect, in a sixth possible implementation manner of the first aspect, for any two or more interference cancellation parameters of a same cell or different cells, effective durations of the interference cancellation parameters and respectively corresponding to the any two or more interference cancellation parameters are the same or different from each other.

With reference to the third possible implementation manner of the first aspect, in a seventh possible implementation manner of the first aspect, the neighboring cell of the original serving cell of the user terminal is determined by using a neighboring cell list of the original serving cell of the user terminal; and the neighboring cell of the other cell for which the interference cancellation parameter is configured is determined by using a neighboring cell list of the other cell for which the interference cancellation parameter is configured.

With reference to the seventh possible implementation manner of the first aspect, in an eighth possible implementation manner of the first aspect, the neighboring cell list of the original serving cell of the user terminal and the neighboring cell list of the other cell for which the interference cancellation parameter is configured are transmitted by the network-side device to the user terminal.

With reference to any one of the first aspect, or the first to the eighth possible implementation manners of the first aspect, in a ninth possible implementation manner of the first aspect, the processing module is specifically configured to apply the received interference cancellation parameter to perform any one or more of the following operations:

applying the received interference cancellation parameter to perform interference cancellation on a control channel of the serving cell of the user terminal, where the control channel includes at least any one or more of a PDCCH (Physical Downlink Control Channel), an EPDCCH (Enhanced Physical Downlink Control Channel), or a PHICH (Physical Hybrid ARQ Indicator Channel); or applying the received interference cancellation parameter to perform interference cancellation on a pilot channel of the serving cell of the user terminal, where the pilot channel includes at least any one or more of a CRS, a CSI-RS (Channel State Information Reference Signal), a DRS (Discovery Reference Signal), a PRS (positioning reference signal), or a DMRS (Demodulation Reference Signal); or applying the received interference cancellation parameter to perform interference cancellation on a data channel of the serving cell of the user terminal, where the data channel includes at least a PDSCH; or applying the received interference cancellation parameter to perform interference cancellation on a synchronization channel of the serving cell of the user terminal, where the synchronization channel includes at least a PSS (Primary Synchronization Signal) and/or an SSS (Secondary Synchronization Signal); or applying the received interference cancellation parameter to perform a measurement, where the measurement includes at least one or more of an RRM (Radio Resource Management) measurement, an RLM (Radio Link Management) measurement, a CQI (channel quality indicator) measurement, or a CSI (channel state information) measurement.

With reference to any one of the first aspect, or the first to the ninth possible implementation manners of the first aspect, in a tenth possible implementation manner of the first aspect, the receiving module is further configured to receive, before the received interference cancellation parameter is applied to perform the interference cancellation operation, indication information delivered by the network-side device and used to indicate specific operation content to be performed in the interference cancellation operation; and the processing module is specifically configured to determine, according to the indication information included in the interference cancellation indication information and used to indicate the specific operation content to be performed in the interference cancellation operation, the specific operation content to be performed in the interference cancellation operation, and apply the received interference cancellation parameter to perform the corresponding interference cancellation operation according to the determined specific operation content to be performed in the interference cancellation operation.

With reference to any one of the first aspect, or the first to the tenth possible implementation manners of the first aspect, in an eleventh possible implementation manner of the first aspect, the user terminal further includes a transmission module, where the transmission module is configured to report, to the network-side device when or after the received interference cancellation parameter is applied to perform the interference cancellation operation, an interference cancellation result obtained by applying the received interference cancellation parameter to perform the interference cancellation operation.

With reference to the eleventh possible implementation manner of the first aspect, in a twelfth possible implementation manner of the first aspect, the interference cancellation result includes at least one or more of the following information:

identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation.

With reference to the eleventh or the twelfth possible implementation manner of the first aspect, in a thirteenth possible implementation manner of the first aspect, the receiving module is further configured to: when or after the received interference cancellation parameter is applied to perform the interference cancellation operation, receive instruction information delivered by the network-side device and used to instruct the user terminal to release or no longer apply the interference cancellation parameter, or receive an updated interference cancellation parameter delivered by the network-side device; and the processing module is further configured to: when or after the received interference cancellation parameter is applied to perform the interference cancellation operation, if it is determined that the interference cancellation effect obtained by applying the received interference cancellation parameter to perform the interference cancellation operation does not meet a specified condition, release or no longer apply the interference cancellation parameter; or if it is determined that the receiving module receives the instruction information delivered by the network-side device and used to instruct the user terminal to release or no longer apply the interference cancellation parameter, release or no longer apply the interference cancellation parameter; or if it is determined that the receiving module receives the updated interference cancellation parameter delivered by the network-side device, perform the corresponding interference cancellation operation according to the received updated interference cancellation parameter.

With reference to any one of the first aspect, or the first to the thirteenth possible implementation manners of the first aspect, in a fourteenth possible implementation manner of the first aspect, the receiving module is further configured to receive an RRC (Radio Resource Control) message delivered by the network-side device, or receive second instruction information delivered by the network-side device; and the processing module is further configured to: after the interference cancellation parameter delivered by the network-side device is received, if it is determined that the receiving module receives the RRC message delivered by the network-side device and it is determined that the RRC message does not carry the corresponding interference cancellation parameter, continue to apply the received interference cancellation parameter according to a specified second interference cancellation parameter application rule or the second instruction information delivered by the network-side device and received by the receiving module, or release or no longer apply the received interference cancellation parameter.

With reference to any one of the first aspect, or the first to the fourteenth possible implementation manners of the first aspect, in a fifteenth possible implementation manner of the first aspect, the receiving module is further configured to receive third instruction information delivered by the network-side device; and the processing module is further configured to: in the process of performing cell reestablishment or cell handover, continue to apply any one or more of the following dedicated radio resource configuration parameters according to a specified dedicated radio resource configuration parameter application rule or the third instruction information delivered by the network-side device, or release or no longer apply any one or more of the following dedicated radio resource configuration parameters:

an SRB (Signaling Radio Bearer) configuration parameter, a DRB (Data Radio Bearer) configuration parameter, a MAC (Media access control) layer configuration parameter, an SPS (Semi-Persistent Scheduling) configuration parameter, or a dedicated physical layer configuration parameter.

With reference to any one of the first aspect, or the first to the fifteenth possible implementation manners of the first aspect, in a sixteenth possible implementation manner of the first aspect, the interference cancellation parameter received by the receiving module is obtained by the network-side device from a neighboring network-side device or a core network, where the neighboring network-side device is a network-side device that provides a service for the neighboring cell of the serving cell in which the user terminal is located.

With reference to any one of the first aspect, or the first to the sixteenth possible implementation manners of the first aspect, in a seventeenth possible implementation manner of the first aspect, the user terminal exchanges information with the network-side device based on at least one or more of a dedicated message, a broadcast message, an RRC message, a MAC layer message, or a physical layer message.

According to a second aspect, a network-side device is provided and includes:

a parameter transmission module, configured to deliver an interference cancellation parameter to a user terminal, so that the user terminal applies the interference cancellation parameter received from the network-side device, to perform an interference cancellation operation; and a rule transmission module, configured to deliver a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter.

With reference to the second aspect, in a first possible implementation manner of the second aspect, the interference cancellation parameter delivered by the parameter transmission module to the user terminal includes at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN configuration information of a neighboring cell of a serving cell in which the user terminal is located, information about a virtual cell ID and an nSCID of a neighboring cell of a serving cell in which the user terminal is located, a TDD configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

With reference to the second aspect or the first possible implementation manner of the second aspect, in a second possible implementation manner of the second aspect, the first interference cancellation parameter application rule includes any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

With reference to the second aspect, or the first or the second possible implementation manner of the second aspect, in a third possible implementation manner of the second aspect, the first instruction information includes instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover.

With reference to the second possible implementation manner of the second aspect, in a fourth possible implementation manner of the second aspect, for the any interference cancellation parameter received by the user terminal, the effective duration of the interference cancellation parameter is transmitted by the network-side device to the user terminal.

With reference to the second or the fourth possible implementation manner of the second aspect, in a fifth possible implementation manner of the second aspect, for any two or more interference cancellation parameters of a same cell or different cells, effective durations of the interference cancellation parameters and respectively corresponding to the any two or more interference cancellation parameters are the same or different from each other.

With reference to the second possible implementation manner of the second aspect, in a sixth possible implementation manner of the second aspect, the neighboring cell of the original serving cell of the user terminal is determined by using a neighboring cell list of the original serving cell of the user terminal; and the neighboring cell of the other cell for which the interference cancellation parameter is configured is determined by using a neighboring cell list of the other cell for which the interference cancellation parameter is configured.

With reference to the sixth possible implementation manner of the second aspect, in a seventh possible implementation manner of the second aspect, the neighboring cell list of the original serving cell of the user terminal and the neighboring cell list of the other cell for which the interference cancellation parameter is configured are transmitted by the network-side device to the user terminal.

With reference to any one of the second aspect, or the first to the seventh possible implementation manners of the second aspect, in an eighth possible implementation manner of the second aspect, the rule transmission module is further configured to deliver, to the user terminal before the user terminal applies the received interference cancellation parameter to perform the interference cancellation operation, indication information used to indicate specific operation content to be performed in the interference cancellation operation, so that the user terminal determines, according to the indication information included in the interference cancellation indication information and used to indicate the specific operation content to be performed in the interference cancellation operation, the specific operation content to be performed in the interference cancellation operation, and applies the received interference cancellation parameter to perform the corresponding interference cancellation operation according to the determined specific operation content to be performed in the interference cancellation operation.

With reference to any one of the second aspect, or the first to the eighth possible implementation manners of the second aspect, in a ninth possible implementation manner of the second aspect, the network-side device further includes a result receiving module, where the result receiving module is configured to receive an interference cancellation result obtained by applying the received interference cancellation parameter to perform the interference cancellation operation and reported by the user terminal.

With reference to the ninth possible implementation manner of the second aspect, in a tenth possible implementation manner of the second aspect, the interference cancellation result includes at least one or more of the following information:

identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation.

With reference to the ninth or the tenth possible implementation manner of the second aspect, in an eleventh possible implementation manner of the second aspect, the rule transmission module is further configured to deliver, to the user terminal after the interference cancellation result reported by the user terminal is received, if it is determined that the interference cancellation effect obtained by the user terminal by applying the received interference cancellation parameter to perform the interference cancellation operation does not meet a specified condition, instruction information used to instruct the user terminal to release or no longer apply the interference cancellation parameter, so that the user terminal releases or no longer applies the interference cancellation parameter; and the parameter transmission module is further configured to deliver, after the interference cancellation result reported by the user terminal is received, an updated interference cancellation parameter to the user terminal if it is determined that the interference cancellation effect obtained by the user terminal by applying the received interference cancellation parameter to perform the interference cancellation operation does not meet the specified condition, so that the user terminal performs the corresponding interference cancellation operation according to the updated interference cancellation parameter.

With reference to any one of the second aspect, or the first to the eleventh possible implementation manners of the second aspect, in a twelfth possible implementation manner of the second aspect, the rule transmission module is further configured to deliver a specified second interference cancellation parameter application rule or second instruction information to the user terminal when or after the interference cancellation parameter is delivered to the user terminal, so that when the user terminal receives an RRC message delivered by the network-side device and determines that the RRC message does not carry the corresponding interference cancellation parameter, the user terminal continues to apply the previously received interference cancellation parameter according to the second interference cancellation parameter application rule or the second instruction information, or releases or no longer applies the previously received interference cancellation parameter.

With reference to any one of the second aspect, or the first to the twelfth possible implementation manners of the second aspect, in a thirteenth possible implementation manner of the second aspect, the rule transmission module is further configured to deliver a specified dedicated radio resource configuration parameter application rule or third instruction information to the user terminal, so that in the process of performing cell reestablishment or cell handover, the user terminal continues to apply any one or more of the following dedicated radio resource configuration parameters according to the dedicated radio resource configuration parameter application rule or the third instruction information, or releases or no longer applies any one or more of the following dedicated radio resource configuration parameters:

an SRB configuration parameter, a DRB configuration parameter, a MAC layer configuration parameter, an SPS configuration parameter, or a dedicated physical layer configuration parameter.

With reference to any one of the second aspect, or the first to the thirteenth possible implementation manners of the second aspect, in a fourteenth possible implementation manner of the second aspect, the network-side device further includes a parameter obtaining module, where the parameter obtaining module is configured to obtain the corresponding interference cancellation parameter from a neighboring network-side device or a core network before the interference cancellation parameter is delivered to the user terminal, where the neighboring network-side device is a network-side device that provides a service for the neighboring cell of the serving cell in which the user terminal is located.

With reference to any one of the second aspect, or the first to the fourteenth possible implementation manners of the second aspect, in a fifteenth possible implementation manner of the second aspect, the network-side device exchanges information with the user terminal based on at least one or more of a dedicated message, a broadcast message, an RRC message, a MAC layer message, or a physical layer message.

According to a third aspect, a user terminal is provided and includes:

a receiver, configured to receive an interference cancellation parameter delivered by a network-side device, or further configured to receive first instruction information delivered by a network-side device; and a processor, configured to apply the interference cancellation parameter received by the receiver, to perform an interference cancellation operation, and in a process of performing cell reestablishment or cell handover, for any received interference cancellation parameter, continue to apply the interference cancellation parameter to perform an interference cancellation operation according to a specified first interference cancellation parameter application rule or the first instruction information received by the receiver, or release or no longer apply the interference cancellation parameter.

With reference to the third aspect, in a first possible implementation manner of the third aspect, the interference cancellation parameter received by the receiver includes at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN configuration information of a neighboring cell of a serving cell in which the user terminal is located, information about a virtual cell ID and an nSCID of a neighboring cell of a serving cell in which the user terminal is located, a TDD configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

With reference to the third aspect or the first possible implementation manner of the third aspect, in a second possible implementation manner of the third aspect, the first interference cancellation parameter application rule is transmitted by the network-side device to the user terminal.

With reference to the third aspect, or the first or the second possible implementation manner of the third aspect, in a third possible implementation manner of the third aspect, the first interference cancellation parameter application rule includes any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation; and the processor is specifically configured to: in the process of performing cell reestablishment or cell handover, continue to apply the received interference cancellation parameter to perform the interference cancellation operation; or specifically configured to, in the process of performing cell reestablishment or cell handover, if it is determined that reestablishment or handover to the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the target serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continue to apply the interference cancellation parameter to perform the interference cancellation operation, or else, release or no longer apply the interference cancellation parameter.

With reference to any one of the third aspect, or the first to the third possible implementation manners of the third aspect, in a fourth possible implementation manner of the third aspect, the first instruction information includes instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover; and the processor is specifically configured to: in the process of performing cell reestablishment or cell handover, for the any received interference cancellation parameter, if it is determined that instruction information delivered by the network-side device and used to instruct the user terminal to continue to apply the interference cancellation parameter in the process of performing cell reestablishment or cell handover is received, continue to apply the interference cancellation parameter to perform the interference cancellation operation; or if it is determined that instruction information delivered by the network-side device and used to instruct the user terminal to release or no longer apply the interference cancellation parameter in the process of performing cell reestablishment or cell handover is received, release or no longer apply the interference cancellation parameter.

With reference to the third possible implementation manner of the third aspect, in a fifth possible implementation manner of the third aspect, for the any received interference cancellation parameter, the effective duration of the interference cancellation parameter is transmitted by the network-side device to the user terminal.

With reference to the third or the fifth possible implementation manner of the third aspect, in a sixth possible implementation manner of the third aspect, for any two or more interference cancellation parameters of a same cell or different cells, effective durations of the interference cancellation parameters and respectively corresponding to the any two or more interference cancellation parameters are the same or different from each other.

With reference to the third possible implementation manner of the third aspect, in a seventh possible implementation manner of the third aspect, the neighboring cell of the original serving cell of the user terminal is determined by using a neighboring cell list of the original serving cell of the user terminal; and the neighboring cell of the other cell for which the interference cancellation parameter is configured is determined by using a neighboring cell list of the other cell for which the interference cancellation parameter is configured.

With reference to the seventh possible implementation manner of the third aspect, in an eighth possible implementation manner of the third aspect, the neighboring cell list of the original serving cell of the user terminal and the neighboring cell list of the other cell for which the interference cancellation parameter is configured are transmitted by the network-side device to the user terminal.

With reference to any one of the third aspect, or the first to the eighth possible implementation manners of the third aspect, in a ninth possible implementation manner of the third aspect, the processor is specifically configured to apply the received interference cancellation parameter to perform any one or more of the following operations:

applying the received interference cancellation parameter to perform interference cancellation on a control channel of the serving cell of the user terminal, where the control channel includes at least any one or more of a PDCCH, an EPDCCH, or a PHICH; or applying the received interference cancellation parameter to perform interference cancellation on a pilot channel of the serving cell of the user terminal, where the pilot channel includes at least any one or more of a CRS, a CSI-RS, a DRS, a PRS, or a DMRS; or applying the received interference cancellation parameter to perform interference cancellation on a data channel of the serving cell of the user terminal, where the data channel includes at least a PDSCH; or applying the received interference cancellation parameter to perform interference cancellation on a synchronization channel of the serving cell of the user terminal, where the synchronization channel includes at least a PSS and/or an SSS; or applying the received interference cancellation parameter to perform a measurement, where the measurement includes at least one or more of an RRM measurement, an RLM measurement, a CQI measurement, or a CSI measurement.

With reference to any one of the third aspect, or the first to the ninth possible implementation manners of the third aspect, in a tenth possible implementation manner of the third aspect, the receiver is further configured to receive, before the received interference cancellation parameter is applied to perform the interference cancellation operation, indication information delivered by the network-side device and used to indicate specific operation content to be performed in the interference cancellation operation; and the processor is specifically configured to determine, according to the indication information included in the interference cancellation indication information and used to indicate the specific operation content to be performed in the interference cancellation operation, the specific operation content to be performed in the interference cancellation operation, and apply the received interference cancellation parameter to perform the corresponding interference cancellation operation according to the determined specific operation content to be performed in the interference cancellation operation.

With reference to any one of the third aspect, or the first to the tenth possible implementation manners of the third aspect, in an eleventh possible implementation manner of the third aspect, the user terminal further includes a transmitter, where the transmitter is configured to report, to the network-side device when or after the received interference cancellation parameter is applied to perform the interference cancellation operation, an interference cancellation result obtained by applying the received interference cancellation parameter to perform the interference cancellation operation.

With reference to the eleventh possible implementation manner of the third aspect, in a twelfth possible implementation manner of the third aspect, the interference cancellation result includes at least one or more of the following information:

identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation.

With reference to the eleventh or the twelfth possible implementation manner of the third aspect, in a thirteenth possible implementation manner of the third aspect, the receiver is further configured to: when or after the received interference cancellation parameter is applied to perform the interference cancellation operation, receive instruction information delivered by the network-side device and used to instruct the user terminal to release or no longer apply the interference cancellation parameter, or receive an updated interference cancellation parameter delivered by the network-side device; and the processor is further configured to: when or after the received interference cancellation parameter is applied to perform the interference cancellation operation, if it is determined that the interference cancellation effect obtained by applying the received interference cancellation parameter to perform the interference cancellation operation does not meet a specified condition, release or no longer apply the interference cancellation parameter; or if it is determined that the receiver receives the instruction information delivered by the network-side device and used to instruct the user terminal to release or no longer apply the interference cancellation parameter, release or no longer apply the interference cancellation parameter; or if it is determined that the receiver receives the updated interference cancellation parameter delivered by the network-side device, perform the corresponding interference cancellation operation according to the received updated interference cancellation parameter.

With reference to any one of the third aspect, or the first to the thirteenth possible implementation manners of the third aspect, in a fourteenth possible implementation manner of the third aspect, the receiver is further configured to receive an RRC message delivered by the network-side device, or receive second instruction information delivered by the network-side device; and the processor is further configured to: after the interference cancellation parameter delivered by the network-side device is received, if it is determined that the receiver receives the RRC message delivered by the network-side device and it is determined that the RRC message does not carry the corresponding interference cancellation parameter, continue to apply the received interference cancellation parameter according to a specified second interference cancellation parameter application rule or the second instruction information delivered by the network-side device and received by the receiver, or release or no longer apply the received interference cancellation parameter.

With reference to any one of the third aspect, or the first to the fourteenth possible implementation manners of the third aspect, in a fifteenth possible implementation manner of the third aspect, the receiver is further configured to receive third instruction information delivered by the network-side device; and the processor is further configured to: in the process of performing cell reestablishment or cell handover, continue to apply any one or more of the following dedicated radio resource configuration parameters according to a specified dedicated radio resource configuration parameter application rule or the third instruction information received by the receiver, or release or no longer apply any one or more of the following dedicated radio resource configuration parameters:

an SRB configuration parameter, a DRB configuration parameter, a MAC layer configuration parameter, an SPS configuration parameter, or a dedicated physical layer configuration parameter.

With reference to any one of the third aspect, or the first to the fifteenth possible implementation manners of the third aspect, in a sixteenth possible implementation manner of the third aspect, the interference cancellation parameter received by the receiver is obtained by the network-side device from a neighboring network-side device or a core network, where the neighboring network-side device is a network-side device that provides a service for the neighboring cell of the serving cell in which the user terminal is located.

With reference to any one of the third aspect, or the first to the sixteenth possible implementation manners of the third aspect, in a seventeenth possible implementation manner of the third aspect, the user terminal exchanges information with the network-side device based on at least one or more of a dedicated message, a broadcast message, an RRC message, a MAC layer message, or a physical layer message.

According to a fourth aspect, a network-side device is provided, and includes a transmitter and a memory that is configured to store various types of application program code required when the network-side device performs a corresponding operation, where the transmitter is configured to: deliver an interference cancellation parameter to a user terminal, so that the user terminal applies the interference cancellation parameter received from the network-side device, to perform an interference cancellation operation; and deliver a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter.

With reference to the fourth aspect, in a first possible implementation manner of the fourth aspect, the interference cancellation parameter delivered by the transmitter to the user terminal includes at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN configuration information of a neighboring cell of a serving cell in which the user terminal is located, information about a virtual cell ID and an nSCID of a neighboring cell of a serving cell in which the user terminal is located, a TDD configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

With reference to the fourth aspect or the first possible implementation manner of the fourth aspect, in a second possible implementation manner of the fourth aspect, the first interference cancellation parameter application rule includes any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

With reference to the fourth aspect, or the first or the second possible implementation manner of the fourth aspect, in a third possible implementation manner of the fourth aspect, the first instruction information includes instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover.

With reference to the second possible implementation manner of the fourth aspect, in a fourth possible implementation manner of the fourth aspect, for the any interference cancellation parameter received by the user terminal, the effective duration of the interference cancellation parameter is transmitted by the network-side device to the user terminal.

With reference to the second or the fourth possible implementation manner of the fourth aspect, in a fifth possible implementation manner of the fourth aspect, for any two or more interference cancellation parameters of a same cell or different cells, effective durations of the interference cancellation parameters and respectively corresponding to the any two or more interference cancellation parameters are the same or different from each other.

With reference to the second possible implementation manner of the fourth aspect, in a sixth possible implementation manner of the fourth aspect, the neighboring cell of the original serving cell of the user terminal is determined by using a neighboring cell list of the original serving cell of the user terminal; and the neighboring cell of the other cell for which the interference cancellation parameter is configured is determined by using a neighboring cell list of the other cell for which the interference cancellation parameter is configured.

With reference to the sixth possible implementation manner of the fourth aspect, in a seventh possible implementation manner of the fourth aspect, the neighboring cell list of the original serving cell of the user terminal and the neighboring cell list of the other cell for which the interference cancellation parameter is configured are transmitted by the network-side device to the user terminal.

With reference to any one of the fourth aspect, or the first to the seventh possible implementation manners of the fourth aspect, in an eighth possible implementation manner of the fourth aspect, the transmitter is further configured to deliver, to the user terminal before the user terminal applies the received interference cancellation parameter to perform the interference cancellation operation, indication information used to indicate specific operation content to be performed in the interference cancellation operation, so that the user terminal determines, according to the indication information included in the interference cancellation indication information and used to indicate the specific operation content to be performed in the interference cancellation operation, the specific operation content to be performed in the interference cancellation operation, and applies the received interference cancellation parameter to perform the corresponding interference cancellation operation according to the determined specific operation content to be performed in the interference cancellation operation.

With reference to any one of the fourth aspect, or the first to the eighth possible implementation manners of the fourth aspect, in a ninth possible implementation manner of the fourth aspect, the network-side device further includes a receiver, where the receiver is configured to receive an interference cancellation result obtained by applying the received interference cancellation parameter to perform the interference cancellation operation and reported by the user terminal.

With reference to the ninth possible implementation manner of the fourth aspect, in a tenth possible implementation manner of the fourth aspect, the interference cancellation result includes at least one or more of the following information:

identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation.

With reference to the ninth or the tenth possible implementation manner of the fourth aspect, in an eleventh possible implementation manner of the fourth aspect, the transmitter is further configured to: after the interference cancellation result reported by the user terminal is received, if it is determined that the interference cancellation effect obtained by the user terminal by applying the received interference cancellation parameter to perform the interference cancellation operation does not meet a specified condition, deliver, to the user terminal, instruction information used to instruct the user terminal to release or no longer apply the interference cancellation parameter, so that the user terminal releases or no longer applies the interference cancellation parameter; or deliver an updated interference cancellation parameter to the user terminal, so that the user terminal performs the corresponding interference cancellation operation according to the updated interference cancellation parameter.

With reference to any one of the fourth aspect, or the first to the eleventh possible implementation manners of the fourth aspect, in a twelfth possible implementation manner of the fourth aspect, the transmitter is further configured to deliver a specified second interference cancellation parameter application rule or second instruction information to the user terminal when or after the interference cancellation parameter is delivered to the user terminal, so that when the user terminal receives an RRC message delivered by the network-side device and determines that the RRC message does not carry the corresponding interference cancellation parameter, the user terminal continues to apply the previously received interference cancellation parameter according to the second interference cancellation parameter application rule or the second instruction information, or releases or no longer applies the previously received interference cancellation parameter.

With reference to any one of the fourth aspect, or the first to the twelfth possible implementation manners of the fourth aspect, in a thirteenth possible implementation manner of the fourth aspect, the transmitter is further configured to deliver a specified dedicated radio resource configuration parameter application rule or third instruction information to the user terminal, so that in the process of performing cell reestablishment or cell handover, the user terminal continues to apply any one or more of the following dedicated radio resource configuration parameters according to the dedicated radio resource configuration parameter application rule or the third instruction information, or releases or no longer applies any one or more of the following dedicated radio resource configuration parameters:

an SRB configuration parameter, a DRB configuration parameter, a MAC layer configuration parameter, an SPS configuration parameter, or a dedicated physical layer configuration parameter.

With reference to any one of the fourth aspect, or the first to the thirteenth possible implementation manners of the fourth aspect, in a fourteenth possible implementation manner of the fourth aspect, the network-side device further includes a processor, where the processor is configured to obtain the corresponding interference cancellation parameter from a neighboring network-side device or a core network before the interference cancellation parameter is delivered to the user terminal, where the neighboring network-side device is a network-side device that provides a service for the neighboring cell of the serving cell in which the user terminal is located.

With reference to any one of the fourth aspect, or the first to the fourteenth possible implementation manners of the fourth aspect, in a fifteenth possible implementation manner of the fourth aspect, the network-side device exchanges information with the user terminal based on at least one or more of a dedicated message, a broadcast message, an RRC message, a MAC layer message, or a physical layer message.

According to a fifth aspect, an interference cancellation method is provided and includes:

receiving, by a user terminal, an interference cancellation parameter delivered by a network-side device, and applying the received interference cancellation parameter to perform an interference cancellation operation; and in a process of performing cell reestablishment or cell handover, for any received interference cancellation parameter, continuing to apply the interference cancellation parameter to perform an interference cancellation operation according to a specified first interference cancellation parameter application rule or first instruction information delivered by the network-side device, or releasing or no longer applying the interference cancellation parameter.

With reference to the fifth aspect, in a first possible implementation manner of the fifth aspect, the received interference cancellation parameter includes at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN configuration information of a neighboring cell of a serving cell in which the user terminal is located, information about a virtual cell ID and an nSCID of a neighboring cell of a serving cell in which the user terminal is located, a TDD configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

With reference to the fifth aspect or the first possible implementation manner of the fifth aspect, in a second possible implementation manner of the fifth aspect, the first interference cancellation parameter application rule is transmitted by the network-side device to the user terminal.

With reference to the fifth aspect, or the first or the second possible implementation manner of the fifth aspect, in a third possible implementation manner of the fifth aspect, the first interference cancellation parameter application rule includes any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation; and the in a process of performing cell reestablishment or cell handover, for any received interference cancellation parameter, continuing to apply the interference cancellation parameter to perform an interference cancellation operation according to a specified first interference cancellation parameter application rule, or releasing or no longer applying the interference cancellation parameter, includes:

in the process of performing cell reestablishment or cell handover, continuing to apply the received interference cancellation parameter to perform the interference cancellation operation; or in the process of performing cell reestablishment or cell handover, if it is determined that reestablishment or handover to the original serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the neighboring cell of the original serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the target serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the cell for which the received interference cancellation parameter is configured is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the neighboring cell of the cell for which the received interference cancellation parameter is configured is required, continuing to apply the received interference cancellation parameter to perform the interference cancellation operation, or else, releasing or no longer applying the interference cancellation parameter; or in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continuing to apply the interference cancellation parameter to perform the interference cancellation operation, or else, releasing or no longer applying the interference cancellation parameter.

With reference to any one of the fifth aspect, or the first to the third possible implementation manners of the fifth aspect, in a fourth possible implementation manner of the fifth aspect, the first instruction information includes instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover; and the in a process of performing cell reestablishment or cell handover, for any received interference cancellation parameter, continuing to apply the interference cancellation parameter to perform an interference cancellation operation according to first instruction information delivered by the network-side device, or releasing or no longer applying the interference cancellation parameter, includes:

in the process of performing cell reestablishment or cell handover, for the any received interference cancellation parameter, if it is determined that instruction information delivered by the network-side device and used to instruct the user terminal to continue to apply the interference cancellation parameter in the process of performing cell reestablishment or cell handover is received, continuing to apply the interference cancellation parameter to perform the interference cancellation operation; or if it is determined that instruction information delivered by the network-side device and used to instruct the user terminal to release or no longer apply the interference cancellation parameter in the process of performing cell reestablishment or cell handover is received, releasing or no longer applying the interference cancellation parameter.

With reference to the third possible implementation manner of the fifth aspect, in a fifth possible implementation manner of the fifth aspect, for the any received interference cancellation parameter, the effective duration of the interference cancellation parameter is transmitted by the network-side device to the user terminal.

With reference to the third or the fifth possible implementation manner of the fifth aspect, in a sixth possible implementation manner of the fifth aspect, for any two or more interference cancellation parameters of a same cell or different cells, effective durations of the interference cancellation parameters and respectively corresponding to the any two or more interference cancellation parameters are the same or different from each other.

With reference to the third possible implementation manner of the fifth aspect, in a seventh possible implementation manner of the fifth aspect, the neighboring cell of the original serving cell of the user terminal is determined by using a neighboring cell list of the original serving cell of the user terminal; and the neighboring cell of the other cell for which the interference cancellation parameter is configured is determined by using a neighboring cell list of the other cell for which the interference cancellation parameter is configured.

With reference to the seventh possible implementation manner of the fifth aspect, in an eighth possible implementation manner of the fifth aspect, the neighboring cell list of the original serving cell of the user terminal and the neighboring cell list of the other cell for which the interference cancellation parameter is configured are transmitted by the network-side device to the user terminal.

With reference to any one of the fifth aspect, or the first to the eighth possible implementation manners of the fifth aspect, in a ninth possible implementation manner of the fifth aspect, the applying the received interference cancellation parameter to perform an interference cancellation operation includes any one or more of the following operations:

applying the received interference cancellation parameter to perform interference cancellation on a control channel of the serving cell of the user terminal, where the control channel includes at least any one or more of a PDCCH, an EPDCCH, or a PHICH; or applying the received interference cancellation parameter to perform interference cancellation on a pilot channel of the serving cell of the user terminal, where the pilot channel includes at least any one or more of a CRS, a CSI-RS, a DRS, a PRS, or a DMRS; or applying the received interference cancellation parameter to perform interference cancellation on a data channel of the serving cell of the user terminal, where the data channel includes at least a PDSCH; or applying the received interference cancellation parameter to perform interference cancellation on a synchronization channel of the serving cell of the user terminal, where the synchronization channel includes at least a PSS and/or an SSS; or applying the received interference cancellation parameter to perform a measurement, where the measurement includes at least one or more of an RRM measurement, an RLM measurement, a CQI measurement, or a CSI measurement.

With reference to any one of the fifth aspect, or the first to the ninth possible implementation manners of the fifth aspect, in a tenth possible implementation manner of the fifth aspect, before the applying the received interference cancellation parameter to perform an interference cancellation operation, the method further includes:

receiving indication information delivered by the network-side device and used to indicate specific operation content to be performed in the interference cancellation operation; and the applying the received interference cancellation parameter to perform an interference cancellation operation includes:

determining, according to the indication information included in the interference cancellation indication information and used to indicate the specific operation content to be performed in the interference cancellation operation, the specific operation content to be performed in the interference cancellation operation, and applying the received interference cancellation parameter to perform the corresponding interference cancellation operation according to the determined specific operation content to be performed in the interference cancellation operation.

With reference to any one of the fifth aspect, or the first to the tenth possible implementation manners of the fifth aspect, in an eleventh possible implementation manner of the fifth aspect, when or after the applying the received interference cancellation parameter to perform an interference cancellation operation, the method further includes:

reporting, to the network-side device, an interference cancellation result obtained by applying the received interference cancellation parameter to perform the interference cancellation operation.

With reference to the eleventh possible implementation manner of the fifth aspect, in a twelfth possible implementation manner of the fifth aspect, the interference cancellation result includes at least one or more of the following information:

identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation.

With reference to the eleventh or the twelfth possible implementation manner of the fifth aspect, in a thirteenth possible implementation manner of the fifth aspect, when or after the applying the received interference cancellation parameter to perform an interference cancellation operation, the method further includes:

if it is determined that the interference cancellation effect obtained by applying the received interference cancellation parameter to perform the interference cancellation operation does not meet a specified condition, releasing or no longer applying the interference cancellation parameter; or if instruction information delivered by the network-side device and used to instruct the user terminal to release or no longer apply the interference cancellation parameter is received, releasing or no longer applying the interference cancellation parameter; or if an updated interference cancellation parameter delivered by the network-side device is received, performing the corresponding interference cancellation operation according to the received updated interference cancellation parameter.

With reference to any one of the fifth aspect, or the first to the thirteenth possible implementation manners of the fifth aspect, in a fourteenth possible implementation manner of the fifth aspect, after the receiving an interference cancellation parameter delivered by a network-side device, the method further includes:

if an RRC message delivered by the network-side device is received, and it is determined that the RRC message does not carry the corresponding interference cancellation parameter, continuing to apply the received interference cancellation parameter according to a specified second interference cancellation parameter application rule or second instruction information delivered by the network-side device, or releasing or no longer applying the received interference cancellation parameter.

With reference to any one of the fifth aspect, or the first to the fourteenth possible implementation manners of the fifth aspect, in a fifteenth possible implementation manner of the fifth aspect, the method further includes: in the process of performing cell reestablishment or cell handover, continuing to apply any one or more of the following dedicated radio resource configuration parameters according to a specified dedicated radio resource configuration parameter application rule or third instruction information delivered by the network-side device, or releasing or no longer applying any one or more of the following dedicated radio resource configuration parameters:

an SRB configuration parameter, a DRB configuration parameter, a MAC layer configuration parameter, an SPS configuration parameter, or a dedicated physical layer configuration parameter.

With reference to any one of the fifth aspect, or the first to the fifteenth possible implementation manners of the fifth aspect, in a sixteenth possible implementation manner of the fifth aspect, the interference cancellation parameter received by the user terminal is obtained by the network-side device from a neighboring network-side device or a core network, where the neighboring network-side device is a network-side device that provides a service for the neighboring cell of the serving cell in which the user terminal is located.

With reference to any one of the fifth aspect, or the first to the sixteenth possible implementation manners of the fifth aspect, in a seventeenth possible implementation manner of the fifth aspect, the user terminal exchanges information with the network-side device based on at least one or more of a dedicated message, a broadcast message, an RRC message, a MAC layer message, or a physical layer message.

According to a sixth aspect, an interference cancellation method is provided and includes:

delivering, by a network-side device, an interference cancellation parameter to a user terminal, so that the user terminal applies the interference cancellation parameter received from the network-side device, to perform an interference cancellation operation; and delivering a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter.

With reference to the sixth aspect, in a first possible implementation manner of the sixth aspect, the interference cancellation parameter delivered by the network-side device to the user terminal includes at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN configuration information of a neighboring cell of a serving cell in which the user terminal is located, information about a virtual cell ID and an nSCID of a neighboring cell of a serving cell in which the user terminal is located, a TDD configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

With reference to the sixth aspect or the first possible implementation manner of the sixth aspect, in a second possible implementation manner of the sixth aspect, the first interference cancellation parameter application rule includes any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

With reference to the sixth aspect, or the first or the second possible implementation manner of the sixth aspect, in a third possible implementation manner of the sixth aspect, the first instruction information includes instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover.

With reference to the second possible implementation manner of the sixth aspect, in a fourth possible implementation manner of the sixth aspect, for the any interference cancellation parameter received by the user terminal, the effective duration of the interference cancellation parameter is transmitted by the network-side device to the user terminal.

With reference to the second or the fourth possible implementation manner of the sixth aspect, in a fifth possible implementation manner of the sixth aspect, for any two or more interference cancellation parameters of a same cell or different cells, effective durations of the interference cancellation parameters and respectively corresponding to the any two or more interference cancellation parameters are the same or different from each other.

With reference to the second possible implementation manner of the sixth aspect, in a sixth possible implementation manner of the sixth aspect, the neighboring cell of the original serving cell of the user terminal is determined by using a neighboring cell list of the original serving cell of the user terminal; and the neighboring cell of the other cell for which the interference cancellation parameter is configured is determined by using a neighboring cell list of the other cell for which the interference cancellation parameter is configured.

With reference to the sixth possible implementation manner of the sixth aspect, in a seventh possible implementation manner of the sixth aspect, the neighboring cell list of the original serving cell of the user terminal and the neighboring cell list of the other cell for which the interference cancellation parameter is configured are transmitted by the network-side device to the user terminal.

With reference to any one of the sixth aspect, or the first to the seventh possible implementation manners of the sixth aspect, in an eighth possible implementation manner of the sixth aspect, before the user terminal applies the received interference cancellation parameter to perform an interference cancellation operation, the method further includes:

delivering, to the user terminal, indication information used to indicate specific operation content to be performed in the interference cancellation operation, so that the user terminal determines, according to the indication information included in the interference cancellation indication information and used to indicate the specific operation content to be performed in the interference cancellation operation, the specific operation content to be performed in the interference cancellation operation, and applies the received interference cancellation parameter to perform the corresponding interference cancellation operation according to the determined specific operation content to be performed in the interference cancellation operation.

With reference to any one of the sixth aspect, or the first to the eighth possible implementation manners of the sixth aspect, in a ninth possible implementation manner of the sixth aspect, when or after the user terminal applies the interference cancellation parameter received from the network-side device, to perform an interference cancellation operation, the method further includes:

receiving an interference cancellation result obtained by applying the received interference cancellation parameter to perform the interference cancellation operation and reported by the user terminal.

With reference to the ninth possible implementation manner of the sixth aspect, in a tenth possible implementation manner of the sixth aspect, the interference cancellation result includes at least one or more of the following information:

identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation.

With reference to the ninth or the tenth possible implementation manner of the sixth aspect, in an eleventh possible implementation manner of the sixth aspect, after the receiving an interference cancellation result reported by the user terminal, the method further includes:

if it is determined that the interference cancellation effect obtained by the user terminal by applying the received interference cancellation parameter to perform the interference cancellation operation does not meet a specified condition, delivering, to the user terminal, instruction information used to instruct the user terminal to release or no longer apply the interference cancellation parameter, so that the user terminal releases or no longer applies the interference cancellation parameter; or delivering an updated interference cancellation parameter to the user terminal, so that the user terminal performs the corresponding interference cancellation operation according to the updated interference cancellation parameter.

With reference to any one of the sixth aspect, or the first to the eleventh possible implementation manners of the sixth aspect, in a twelfth possible implementation manner of the sixth aspect, after the delivering an interference cancellation parameter to the user terminal, the method further includes:

delivering a specified second interference cancellation parameter application rule or second instruction information to the user terminal, so that when the user terminal receives an RRC message delivered by the network-side device and determines that the RRC message does not carry the corresponding interference cancellation parameter, the user terminal continues to apply the previously received interference cancellation parameter according to the second interference cancellation parameter application rule or the second instruction information, or releases or no longer applies the previously received interference cancellation parameter.

With reference to any one of the sixth aspect, or the first to the twelfth possible implementation manners of the sixth aspect, in a thirteenth possible implementation manner of the sixth aspect, the method further includes:

delivering a specified dedicated radio resource configuration parameter application rule or third instruction information to the user terminal, so that in the process of performing cell reestablishment or cell handover, the user terminal continues to apply any one or more of the following dedicated radio resource configuration parameters according to the dedicated radio resource configuration parameter application rule or the third instruction information, or releases or no longer applies any one or more of the following dedicated radio resource configuration parameters:

an SRB configuration parameter, a DRB configuration parameter, a MAC layer configuration parameter, an SPS configuration parameter, or a dedicated physical layer configuration parameter.

With reference to any one of the sixth aspect, or the first to the thirteenth possible implementation manners of the sixth aspect, in a fourteenth possible implementation manner of the sixth aspect, before the delivering an interference cancellation parameter to the user terminal, the method further includes:

obtaining the corresponding interference cancellation parameter from a neighboring network-side device or a core network, where the neighboring network-side device is a network-side device that provides a service for the neighboring cell of the serving cell in which the user terminal is located.

With reference to any one of the sixth aspect, or the first to the fourteenth possible implementation manners of the sixth aspect, in a fifteenth possible implementation manner of the sixth aspect, the network-side device exchanges information with the user terminal based on at least one or more of a dedicated message, a broadcast message, an RRC message, a MAC layer message, or a physical layer message.

In the technical solutions of the embodiments of the present invention, in a process of performing cell reestablishment or cell handover, for any interference cancellation parameter previously received from a network-side device, a user terminal can continue to apply the interference cancellation parameter to perform an interference cancellation operation according to a specified first interference cancellation parameter application rule or first instruction information delivered by the network-side device, or release or no longer apply the interference cancellation parameter. In this way, a currently existing problem that a user terminal cannot know how to process a previously received interference cancellation parameter in a process of performing cell reestablishment or cell handover can be resolved, and further, an objective of improving an interference cancellation effect can be achieved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide an interference cancellation method and device. In the technical solutions of the embodiments of the present invention, a user terminal may receive an interference cancellation parameter delivered by a network-side device, and apply the received interference cancellation parameter to perform an interference cancellation operation; and in a process of performing cell reestablishment or cell handover, for any received interference cancellation parameter, may continue to apply the interference cancellation parameter to perform an interference cancellation operation according to a specified first interference cancellation parameter application rule or first instruction information delivered by the network-side device, or release or no longer apply the interference cancellation parameter. In this way, a currently existing problem that a user terminal cannot know how to process a previously received interference cancellation parameter in a process of performing cell reestablishment or cell handover can be resolved, and further, an objective of improving an interference cancellation effect can be achieved.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
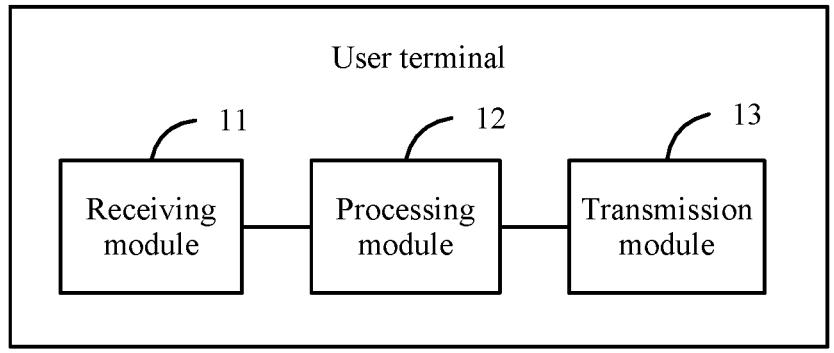
FIG. 1 is a first schematic structural diagram of a user terminal according to Embodiment 1 of the present invention.

Embodiment 1 of the present invention provides a user terminal. As shown in FIG. 1, FIG. 1 is a schematic structural diagram of the user terminal according to Embodiment 1 of the present invention. The user terminal may include a receiving module 11 and a processing module 12.

The receiving module 11 may be configured to receive an interference cancellation parameter delivered by a network-side device, or may be further configured to receive first instruction information delivered by a network-side device.

The processing module 12 may be configured to apply the interference cancellation parameter received by the receiving module 11, to perform an interference cancellation operation, and in a process of performing cell reestablishment or cell handover, for any received interference cancellation parameter, continue to apply the interference cancellation parameter to perform an interference cancellation operation according to a specified first interference cancellation parameter application rule or the first instruction information received by the receiving module 11, or release or no longer apply the interference cancellation parameter.

Specifically, the interference cancellation parameter received by the receiving module 11 may be generally obtained by the network-side device from a neighboring network-side device (such as a neighboring base station) or a core network (such as a mobility management entity). A specific obtaining method may be obtaining by using an X2 interface message, or obtaining by using an Xn interface message, or obtaining by using an S1 interface message. This is not described in this embodiment of the present invention. Generally, the neighboring network-side device may be a network-side device that provides a service for a neighboring cell of a serving cell in which the user terminal is located. It may be understood that, the neighboring network-side device and the network-side device may be a same network-side device. This is also not described in this embodiment of the present invention.

Further, the interference cancellation parameter received by the receiving module 11 may include at least one or more of the following parameters:

(1) A cell identity of the neighboring cell of the serving cell in which the user terminal is located.

(2) Pilot information of the neighboring cell of the serving cell in which the user terminal is located, such as a CRS parameter, a DMRS parameter, a CSI-RS parameter, a PRS parameter, or a DRS parameter. The CRS parameter may include a PCI (Physical Cell Identity) of the CRS parameter and an antenna port quantity or the like; the DMRS parameter may include time or frequency position information or power of the DMRS parameter or the like; the CSI-RS parameter may include time or frequency position information or power of the CSI-RS parameter or the like; the PRS parameter may include time or frequency position information or power of the PRS parameter or the like; the DRS parameter may include time or frequency position information or power of the DRS parameter or the like.

It should be noted that, using the DMRS parameter as an example, the user terminal may estimate a channel of the neighboring cell of the serving cell in which the user terminal is located, and detect, based on the channel, a signal transmitted by the corresponding neighboring cell; or using the CRS parameter as an example, the user terminal may estimate a channel factor of the neighboring cell according to the parameter, and detect, based on the channel factor, a signal transmitted by the neighboring cell. This is not described in this embodiment of the present invention.

(3) A modulation mode of the neighboring cell of the serving cell in which the user terminal is located. For example, it may be a modulation mode used by a PDSCH of the neighboring cell of the serving cell in which the user terminal is located, such as QPSK (Quadrature Phase Shift Keying), 16QAM (Quadrature Amplitude Modulation), or 64QAM. It should be noted that, after the user terminal knows the modulation mode of the neighboring cell, the user terminal may detect an actual transmit symbol of the corresponding neighboring cell based on the parameter, so as to reconstruct a signal of the neighboring cell.

(4) A coding mode of the neighboring cell of the serving cell in which the user terminal is located, such as a convolutional code or a Turbo code. It should be noted that, after knowing the coding mode of the neighboring cell, the user terminal may perform, based on the parameter, error correction on a signal of the neighboring cell by using a decoder, so as to improve accuracy of detecting the signal of the neighboring cell, so that a reconstructed signal of the neighboring cell is more accurate.

(5) A TM (transmission mode) of the neighboring cell of the serving cell in which the user terminal is located. It should be noted that, after knowing the transmission mode of the neighboring cell, the user terminal may estimate a signal of the neighboring cell more effectively.

(6) A precoding matrix of the neighboring cell of the serving cell in which the user terminal is located. It should be noted that, after knowing the precoding matrix of the neighboring cell, the user terminal may estimate a signal of the neighboring cell more effectively.

(7) A coding rate of the neighboring cell of the serving cell in which the user terminal is located, such as 1/3 coding or 1/6 coding. It should be noted that, after knowing the coding rate of the neighboring cell, the user terminal may perform, based on the parameter, error correction on a signal of the neighboring cell by using a decoder, so as to improve accuracy of detecting the signal of the neighboring cell, so that a reconstructed signal of the neighboring cell is more accurate.

That is, to implement more accurate channel estimation, according to a channel estimation status, joint detection may be further performed according to one or more of the possible modulation mode, transmission mode, precoding matrix, or coding rate of the neighboring cell that causes interference, so as to detect an interference signal of the neighboring cell and restore a signal of the user terminal and/or eliminate an interference signal. Specifically, a maximum likelihood algorithm may be used for the joint detection. This is not described in this embodiment of the present invention. In addition, using a PDSCH as an example, when the joint detection is performed, reference may be further made to a parameter of a physical resource (namely, a time-frequency parameter) used by the PDSCH, for example, used PRBs (Physical Resource Blocks), and time or frequency position information of the PRBs. Furthermore, it should be noted that, in this embodiment of the present invention, the user terminal may assume that a PDSCH of the neighboring cell is transmitted on one PRB pair (physical resource block pair), instead of using a type 2 resource allocation mode, so that the user terminal estimates an interference parameter of the neighboring cell conveniently.

(8) A power parameter of the neighboring cell of the serving cell in which the user terminal is located, for example, PA and PB parameters corresponding to a PDSCH of the neighboring cell, where the PA is a user terminal level parameter, the PA indicates a data subcarrier of an OFDM symbol (type-A PDSCH) without a pilot, and a smaller PA indicates that transmit power of the type-A PDSCH is lower than transmit power of a CRS; the PB is a cell-level parameter, the PB indicates a data subcarrier of an OFDM symbol (type-B PDSCH) with a pilot, and a smaller PB indicates that transmit power of the type-B PDSCH is lower than the transmit power of the type-A PDSCH.

It should be noted that, a ratio of data power to CRS power may be determined by using the foregoing PA and PB parameters. In addition, according to the foregoing PA and PB parameters in combination with a channel factor estimated by using a CRS parameter, an equivalent channel factor experienced by the PDSCH may be calculated, and a signal transmitted by the neighboring cell may be decoded by using the equivalent channel factor.

In addition, to better use the PA parameter, three values may be selected from eight values (such as −6, −4.77, −3, −1.77, 0, 1, 2, and 3 dB) of the PA parameter. A possible method is to notify three values in a list manner, for example, PA1=−6 dB, PA2=−3 dB, and PA3=0 dB. However, each value in the eight values of the PA parameter needs to be indicated by three bits, for example, 000 represents −6 dB, and 010 represents −3 dB. Therefore, if three values are notified in the list manner, nine bits in total are required for indicating. Further considering that signaling is notified in a byte alignment manner, in this case, a worst case is that 16 bits in total may be required for indicating, where seven bits are for padding. To reduce a quantity of information bits for notifying the PA parameter, another possible implementation method is to notify three values in a bitmap manner. Because there are eight values, eight bits in total are required. Each bit corresponds to a value. When the bit is set to 1, it represents that the value corresponding to the bit is notified. When the bit is set to 0, it represents that the value corresponding to the bit is not notified. For example, 10101000 indicates that values of the PA parameter that are notified are −6 dB, −3 dB, and 0 dB respectively. Use of the bitmap manner may effectively reduce the quantity of bits for notifying the PA parameter and save signaling overheads.

(9) MBSFN configuration information of the neighboring cell of the serving cell in which the user terminal is located. It should be noted that, after knowing the MBSFN configuration information of the neighboring cell, the user terminal may determine, based on the parameter, a feature of a PDSCH transmitted by the neighboring cell, so as to properly perform corresponding interference cancellation.

(10) Information about a virtual cell ID and an nSCID of the neighboring cell of the serving cell in which the user terminal is located. It should be noted that, after knowing the two parameters virtual cell ID and nSCID of the neighboring cell, the user terminal may determine a scrambling code sequence of a DMRS of the neighboring cell, so as to estimate a channel of the neighboring cell more accurately.

(11) A TDD configuration parameter used by the neighboring cell of the serving cell in which the user terminal is located. The TDD configuration may be any one of existing TDD configurations 0 to 6, or may be a newly introduced configuration. This is not limited in this embodiment of the present invention. In addition, it should be noted that, the TDD configuration parameter may assist the user terminal in determining subframes on which interference cancellation needs to be performed.

(12) First decision information of the neighboring cell of the serving cell in which the user terminal is located. For any neighboring cell, first decision information of the neighboring cell is used to indicate whether a TDD configuration used by the neighboring cell is consistent with a TDD configuration used by the serving cell. In addition, it should be noted that, the first decision information may assist the user terminal in determining subframes on which interference cancellation needs to be performed.

(13) Second decision information of the neighboring cell of the serving cell in which the user terminal is located. The second decision information of the neighboring cell is used to indicate whether dynamic change information of the TDD configuration used by the neighboring cell is consistent with dynamic change information of the TDD configuration used by the serving cell, and may specifically indicate whether the TDD configurations of the neighboring cell and the current cell are consistent after the cell enables a dynamic change function for the TDD configuration. In addition, it should be noted that, the second decision information may also assist the user terminal in determining subframes on which interference cancellation needs to be performed.

(14) Third decision information of the neighboring cell of the serving cell in which the user terminal is located. For any neighboring cell, third decision information of the neighboring cell is used to indicate whether the TDD configuration and an MBSFN configuration used by the neighboring cell are consistent with the TDD configuration and an MBSFN configuration used by the serving cell. In addition, it should be noted that, the third decision information may assist the user terminal in determining subframes on which interference cancellation needs to be performed.

(15) Start symbol information of a PDSCH of the neighboring cell of the serving cell in which the user terminal is located. The start symbol information of the PDSCH may be used to indicate from which symbol the PDSCH starts to be transmitted. For the user terminal, if the user terminal knows the start symbol information of the PDSCH, the user terminal may know from which symbol interference cancellation can be performed, so as to avoid performing interference cancellation from a wrong position, and further achieve an objective of improving interference cancellation performance.

Alternatively, the foregoing interference cancellation parameters may also be interference cancellation parameters of the serving cell in which the user terminal is located, that is, the interference cancellation parameters received by the user terminal may further include each interference cancellation parameter related to the serving cell in which the user terminal is located, in addition to each interference cancellation parameter related to the neighboring cell of the serving cell in which the user terminal is located.

Specifically, when the received interference cancellation parameter is an interference cancellation parameter of the serving cell in which the user terminal is located, the received interference cancellation parameter may further include:

(16) An identity of at least another user terminal paired with the user terminal in performing multi-user MIMO (Multiple-Input Multiple-Output), for example, one or more of a C-RNTI (Cell Radio Network Temporary Identifier) or an S-TMSI (SAE Temporary Mobile Subscriber Identity, system architecture evolution temporary mobile subscriber identity). The identity may assist the user terminal in better eliminating an interference signal of the another user terminal. For example, the user terminal may decode a scheduling command and data of the another user terminal according to the identity of the another user terminal, and then eliminate the scheduling command and data. This is not limited in the present invention.

It should be noted that, some parameters in the foregoing interference cancellation parameters are interference cancellation parameters that are currently used in the art, such as the CRS parameter, and the modulation mode, the transmission mode, or the coding mode of the neighboring cell. In addition, there are also some parameters newly put forward in this embodiment of the present invention, such as the CSI-RS parameter, the PRS parameter, the DRS parameter, the TDD configuration parameter used by the neighboring cell of the serving cell in which the user terminal is located, the first decision information, the second decision information, the third decision information, or the identity of the at least another user terminal paired with the user terminal in performing multi-user MIMO. This is not described in this embodiment of the present invention.

Further, in this embodiment of the present invention, the first interference cancellation parameter application rule may be generally transmitted by the network-side device to the user terminal (specifically may be the receiving module 11), or may be preset and fixed in a protocol as a default rule. This is not limited in this embodiment of the present invention.

Specifically, in this embodiment of the present invention, the user terminal may exchange information with the network-side device based on at least one or more of a dedicated message, a broadcast message, an RRC message, a MAC layer message, or a physical layer message. Therefore, when the first interference cancellation parameter application rule is transmitted by the network-side device to the user terminal, the first interference cancellation parameter application rule may be transmitted by the network-side device to the user terminal based on a dedicated message, a broadcast message, an RRC message, a MAC layer message, or a physical layer message, or the like. This is not described in this embodiment of the present invention.

Specifically, the first interference cancellation parameter application rule may include any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation, where when it is determined that a time period corresponding to the process of cell reestablishment or cell handover is within a time period corresponding to the effective duration of the interference cancellation parameter, it may be determined that the process of cell reestablishment or cell handover occurs within the effective duration of the interference cancellation parameter.

Specifically, for the any received interference cancellation parameter, the effective duration of the interference cancellation parameter may be transmitted by the network-side device to the user terminal (specifically may be the receiving module 11), or may be preset and fixed in the protocol. This is not limited in this embodiment of the present invention.

Further, for the any received interference cancellation parameter, when the effective duration of the interference cancellation parameter is transmitted by the network-side device to the user terminal, the network-side device may transmit the effective duration of the interference cancellation parameter to the user terminal by delivering indication information used to indicate the effective duration of the interference cancellation parameter to the user terminal. That is, in this embodiment of the present invention, the receiving module 11 may be further configured to receive indication information that is delivered by the network-side device and used to indicate an effective duration of each interference cancellation parameter. Specifically, the indication information used to indicate the effective duration of each interference cancellation parameter may be generally received by the receiving module 11 before the received interference cancellation parameter is applied to perform the interference cancellation operation. This is not described in this embodiment of the present invention.

Further, for the any received interference cancellation parameter, the effective duration of the interference cancellation parameter and matching the interference cancellation parameter may be 1 second, 100 milliseconds, 200 subframes or transmission time intervals, 30 radio frames, or the like. This is not limited in this embodiment of the present invention.

Further, it should be noted that, in this embodiment of the present invention, for any two or more interference cancellation parameters of a same cell or different cells, effective durations of the interference cancellation parameters and respectively corresponding to the any two or more interference cancellation parameters may be the same or different from each other.

That is, in this embodiment of the present invention, all interference cancellation parameters in the received interference cancellation parameters may use a common effective duration, or some interference cancellation parameters may use an effective duration, or each interference cancellation parameter may use an independent effective duration. This is not described in this embodiment of the present invention. Furthermore, using a cell as a unit, an interference cancellation parameter of each cell may use an independent effective duration, or interference cancellation parameters of some cells may use a common effective duration, or interference cancellation parameters of all cells may use a common effective duration. This is also not described in this embodiment of the present invention.

Furthermore, it should be noted that, particularly, for the any received interference cancellation parameter, when the receiving module 11 does not receive the effective duration that is of the interference cancellation parameter and matches the interference cancellation parameter and is delivered by the network-side device (or the effective duration that is of the interference cancellation parameter and matches the interference cancellation parameter is not preset), or a value of the received effective duration that is of the interference cancellation parameter and matches the interference cancellation parameter is a null value or infinite (or a value of the preset effective duration that is of the interference cancellation parameter and matches the interference cancellation parameter is a null value or infinite), or the like, the interference cancellation parameter may be always effective, until the user terminal returns to an idle state, or until the receiving module 11 receives instruction information delivered by the network-side device and used to instruct the user terminal to release or no longer apply the interference cancellation parameter. Herein the instruction information may be explicit instruction information, or implicit instruction information (for example, if an RRC message such as an RRC connection setup request message, an RRC connection setup complete message, an RRC connection reestablishment request message, an RRC connection reestablishment complete message, a handover message, or other RRC reconfiguration messages for configuring physical resource parameters or configuring radio bearer parameters is received, and the RRC message does not carry related information of the interference cancellation parameter, the user terminal may release or no longer apply the interference cancellation parameter). This is also not limited in this embodiment of the present invention.

Further, the neighboring cell of the original serving cell of the user terminal is generally determined by using a neighboring cell list of the original serving cell of the user terminal; and the neighboring cell of the other cell for which the interference cancellation parameter is configured is generally determined by using a neighboring cell list of the other cell for which the interference cancellation parameter is configured. In addition, the neighboring cell list of the original serving cell of the user terminal and the neighboring cell list of the other cell for which the interference cancellation parameter is configured may be generally transmitted by the network-side device to the user terminal (specifically may be the receiving module 11). Furthermore, it should be noted that, the neighboring cell list of the original serving cell of the user terminal and the neighboring cell list of the other cell for which the interference cancellation parameter is configured may be generally transmitted by the network-side device to the user terminal based on a dedicated message, a broadcast message, an RRC message, a MAC layer message, or a physical layer message, or the like. This is not described in this embodiment of the present invention.

Correspondingly, the processing module 12 may be specifically configured to: in the process of performing cell reestablishment or cell handover, continue to apply the received interference cancellation parameter to perform the interference cancellation operation; or specifically configured to, in the process of performing cell reestablishment or cell handover, if it is determined that reestablishment or handover to the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the target serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continue to apply the interference cancellation parameter to perform the interference cancellation operation, or else, release or no longer apply the interference cancellation parameter.

It should be noted that, the foregoing execution process is described by using the first interference cancellation parameter application rule to indicate in which cases the interference cancellation parameter may continue to be applied. It may be understood that, the first interference cancellation parameter application rule may be further set for indicating in which cases the corresponding interference cancellation parameter may be released or no longer applied. In this case, the first interference cancellation parameter application rule may specifically include any one or more of the following rules:

releasing or no longer applying the received interference cancellation parameter in the process of performing cell reestablishment or cell handover; or if it is determined that the cell to which reestablishment or handover is required is not the original serving cell of the user terminal, in the process of performing cell reestablishment or cell handover, releasing or no longer applying the received interference cancellation parameter; or if it is determined that the cell to which reestablishment or handover is required is not the neighboring cell of the original serving cell of the user terminal, in the process of performing cell reestablishment or cell handover, releasing or no longer applying the received interference cancellation parameter; or if it is determined that the cell to which reestablishment or handover is required is not the target serving cell of the user terminal, in the process of performing cell reestablishment or cell handover, releasing or no longer applying the received interference cancellation parameter; or if it is determined that the cell to which reestablishment or handover is required is not the cell for which the received interference cancellation parameter is configured, in the process of performing cell reestablishment or cell handover, releasing or no longer applying the received interference cancellation parameter; or if it is determined that the cell to which reestablishment or handover is required is not the neighboring cell of the cell for which the received interference cancellation parameter is configured, in the process of performing cell reestablishment or cell handover, releasing or no longer applying the received interference cancellation parameter; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, releasing or no longer applying the received interference cancellation parameter.

Correspondingly, the processing module 12 may be specifically further configured to: in the process of performing cell reestablishment or cell handover, release or no longer apply the received interference cancellation parameter; or in the process of performing cell reestablishment or cell handover, if it is determined that the cell to which reestablishment or handover is required is not the original serving cell of the user terminal, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the neighboring cell of the original serving cell of the user terminal, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the target serving cell of the user terminal, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the cell for which the received interference cancellation parameter is configured, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the neighboring cell of the cell for which the received interference cancellation parameter is configured, release or no longer apply the received interference cancellation parameter, or else, continue to apply the received interference cancellation parameter to perform the interference cancellation operation; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, release or no longer apply the received interference cancellation parameter, or else, continue to apply the received interference cancellation parameter to perform the interference cancellation operation.

Further, in this embodiment of the present invention, the first instruction information received by the receiving module 11 may include instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover; and generally, the first instruction information may be obtained before the process of performing cell reestablishment or cell handover by the user terminal. This is not described in this embodiment of the present invention.

Correspondingly, the processing module 12 may be specifically configured to: in the process of performing cell reestablishment or cell handover, for the any received interference cancellation parameter, if it is determined that instruction information delivered by the network-side device and used to instruct the user terminal to continue to apply the interference cancellation parameter in the process of performing cell reestablishment or cell handover is received, continue to apply the interference cancellation parameter to perform the interference cancellation operation; or if it is determined that instruction information delivered by the network-side device and used to instruct the user terminal to release or no longer apply the interference cancellation parameter in the process of performing cell reestablishment or cell handover is received, release or no longer apply the interference cancellation parameter.

It should be noted that, for any two or more received interference cancellation parameters, instruction information corresponding to the any two or more interference cancellation parameters and used to instruct the user terminal to continue to apply the corresponding interference cancellation parameters in the process of performing cell reestablishment or cell handover may be same instruction information or may be different instruction information. Preferably, to save network transmission resources and improve transmission efficiency, the instruction information corresponding to the any two or more interference cancellation parameters and used to instruct the user terminal to continue to apply the corresponding interference cancellation parameters in the process of performing cell reestablishment or cell handover may be generally the same instruction information. That is, the network-side device may indicate, by delivering the same instruction information to the user terminal, which interference cancellation parameters may continue to be applied in the process of performing cell reestablishment or cell handover. For example, the same instruction information is used to instruct the user terminal to continue to apply all of the previously configured interference cancellation parameters in the process of performing cell reestablishment or cell handover. This is not described in this embodiment of the present invention.

Similarly, for the any two or more received interference cancellation parameters, instruction information corresponding to the any two or more interference cancellation parameters and used to instruct the user terminal to release or no longer apply the corresponding interference cancellation parameters in the process of performing cell reestablishment or cell handover may be same instruction information or may be different instruction information. This is also not described in this embodiment of the present invention.

Furthermore, the first instruction information may also be generally transmitted by the network-side device to the user terminal (specifically may be the receiving module 11) based on a dedicated message, a broadcast message, an RRC message, a MAC layer message, or a physical layer message, or the like. This is not described in this embodiment of the present invention.

Further, in this embodiment of the present invention, the processing module 12 may be specifically configured to apply (or continue to apply) the received interference cancellation parameter to perform any one or more of the following operations:

applying (or continuing to apply) the received interference cancellation parameter to perform interference cancellation on a control channel of the serving cell of the user terminal, where the control channel may include at least any one or more of a PDCCH, an EPDCCH, or a PHICH; specifically, it should be noted that, the applying (or continuing to apply) the received interference cancellation parameter to perform interference cancellation on a control channel of the serving cell of the user terminal may generally refer to canceling or suppressing interference (such as interference of a control signal, a pilot, a synchronization channel, and/or a data signal from the neighboring cell) on the control channel according to the interference cancellation parameter when the control channel of the serving cell such as the PDCCH, the EPDCCH, or the PHICH is received, so as to improve decoding performance and reliability of the control channel or the like, and this is not described in this embodiment of the present invention; or applying (or continuing to apply) the received interference cancellation parameter to perform interference cancellation on a pilot channel of the serving cell of the user terminal, where the pilot channel may include at least any one or more of a CRS, a CSI-RS, a DRS, a PRS, or a DMRS, or any other possible pilot channel, or the like; further, it should be noted that, the applying (or continuing to apply) the received interference cancellation parameter to perform interference cancellation on a pilot channel of the serving cell of the user terminal may generally refer to canceling or suppressing interference (such as interference of a control signal, a pilot, a synchronization channel, and/or a data signal from the neighboring cell) on the pilot channel according to the interference cancellation parameter when the pilot channel of the serving cell such as the CRS, the CSI-RS, the DRS, the PRS, or the DMRS is received, so as to improve performance and reliability of the pilot channel or the like, and this is not described in this embodiment of the present invention; or applying (or continuing to apply) the received interference cancellation parameter to perform interference cancellation on a data channel of the serving cell of the user terminal, where the data channel may include at least a PDSCH, and the PDSCH may specifically include a PDSCH for transmitting a broadcast message, a RAR (Random access Response) message, a paging message, user data, or the like, and this is not described in this embodiment of the present invention; further, it should be noted that, the applying (or continuing to apply) the received interference cancellation parameter to perform interference cancellation on a data channel of the serving cell of the user terminal may generally refer to canceling or suppressing interference (such as interference of a control signal, a pilot, a synchronization channel, and/or a data signal from the neighboring cell) on the data channel according to the interference cancellation parameter when the data channel of the serving cell such as the PDSCH is received, so as to improve performance and reliability of the data channel or the like, and this is not described in this embodiment of the present invention; or applying (or continuing to apply) the received interference cancellation parameter to perform interference cancellation on a synchronization channel of the serving cell of the user terminal, where the synchronization channel may include at least a PSS and/or an SSS, and this is not described in this embodiment of the present invention; further, it should be noted that, the applying (or continuing to apply) the received interference cancellation parameter to perform interference cancellation on a synchronization channel of the serving cell of the user terminal may generally refer to canceling or suppressing interference (such as interference of a control signal, a pilot, a synchronization channel, and/or a data signal from the neighboring cell) on the synchronization channel according to the interference cancellation parameter when the synchronization channel of the serving cell such as the PSS or the SSS is received, so as to improve performance and reliability of the synchronization channel or the like, and this is not described in this embodiment of the present invention; or applying (or continuing to apply) the received interference cancellation parameter to perform a measurement, where the measurement includes at least one or more of an RRM measurement, an RLM measurement, a CQI measurement, or a CSI measurement; further, it should be noted that, the applying (or continuing to apply) the received interference cancellation parameter to perform a measurement may generally refer to applying the interference cancellation parameter to cancel interference of a control signal, a pilot, a synchronization channel, and/or a data signal, or the like from the neighboring cell in the process of performing the measurement, so that a measurement result is more accurate.

Further, in this embodiment of the present invention, the receiving module 11 may be further configured to receive, before the received interference cancellation parameter is applied (continues to be applied) to perform the interference cancellation operation, indication information delivered by the network-side device and used to indicate specific operation content to be performed in the interference cancellation operation.

Correspondingly, the processing module 12 may be specifically configured to determine, according to the indication information included in the interference cancellation indication information and used to indicate the specific operation content to be performed in the interference cancellation operation, the specific operation content to be performed in the interference cancellation operation, and apply (or continue to apply), according to the determined specific operation content to be performed in the interference cancellation operation, the received interference cancellation parameter to perform the corresponding interference cancellation operation.

For example, if it is determined, according to the indication information included in the interference cancellation indication information and used to indicate the specific operation content to be performed in the interference cancellation operation, that the specific operation content to be performed in the interference cancellation operation is performing interference cancellation on the control channel and the synchronization channel of the serving cell, the corresponding interference cancellation operation may be performed on the control channel and the synchronization channel according to the received interference cancellation parameter. This is not described in this embodiment of the present invention.

Further, in this embodiment of the present invention, the user terminal may further include a transmission module 13.

The transmission module 13 may be configured to report, to the network-side device when or after the received interference cancellation parameter is applied (or continues to be applied) to perform the interference cancellation operation, an interference cancellation result obtained by applying (or continuing to apply) the received interference cancellation parameter to perform the interference cancellation operation, so that the network-side device performs an operation such as interference cancellation parameter optimization, or resource management optimization, or configuration optimization according to the received interference cancellation result.

Specifically, the interference cancellation result may include at least one or more of the following information: identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation, or the like. This is not limited in this embodiment of the present invention. The information about the interference cancellation effect corresponding to the interference cancellation operation may be information about a qualitative parameter such as good or poor, or may be information about a quantitative parameter such as a percentage. This is also not limited in this embodiment of the present invention.

Further, in this embodiment of the present invention, the receiving module 11 may be further configured to receive, before the interference cancellation result obtained by applying (continuing to apply) the received interference cancellation parameter to perform the interference cancellation operation is reported to the network-side device, an interference cancellation result reporting instruction delivered by the network-side device.

Correspondingly, the transmission module 13 may be configured to report, to the network-side device according to the interference cancellation result reporting instruction delivered by the network-side device, the interference cancellation result obtained by applying (continuing to apply) the received interference cancellation parameter to perform the interference cancellation operation.

Certainly, it should be noted that, the transmission module 13 may be further configured to actively report, to the network-side device when or after the received interference cancellation parameter is applied (or continues to be applied) to perform the interference cancellation operation, the interference cancellation result obtained by applying (continuing to apply) the received interference cancellation parameter to perform the interference cancellation operation. This is not described in this embodiment of the present invention.

Further, it should be noted that, the transmission module 13 may be further configured to transmit, to the network-side device before the interference cancellation result obtained by applying (continuing to apply) the received interference cancellation parameter to perform the interference cancellation operation is reported to the network-side device, or before the interference cancellation result reporting instruction delivered by the network-side device is received, indication information used to indicate that the interference cancellation result is available, so that the network-side device may deliver the corresponding interference cancellation result reporting instruction to the user terminal according to the indication information used to indicate that the interference cancellation result is available.

Certainly, it should be noted that, if it is determined that the interference cancellation result is unavailable, the transmission module 13 may further transmit, to the network-side device, indication information used to indicate that the interference cancellation result is unavailable, so as to reduce signaling consumption caused when the network-side device still delivers the corresponding interference cancellation result reporting instruction to the user terminal and the user terminal still reports the corresponding interference cancellation result to the network-side device.

Further, in this embodiment of the present invention, the receiving module 11 may be further configured to: when or after the received interference cancellation parameter is applied (or continues to be applied) to perform the interference cancellation operation, receive instruction information delivered by the network-side device and used to instruct the user terminal to release or no longer apply the interference cancellation parameter, or receive an updated interference cancellation parameter delivered by the network-side device.

Correspondingly, the processing module 12 may be further configured to: when or after the received interference cancellation parameter is applied (continues to be applied) to perform the interference cancellation operation, if it is determined that the interference cancellation effect obtained by applying (continuing to apply) the received interference cancellation parameter to perform the interference cancellation operation does not meet a specified condition (for example, it is determined that the interference cancellation effect corresponding to the interference cancellation operation does not meet a specified threshold), release or no longer apply the interference cancellation parameter, so as to reduce processing complexity of the user terminal; or if it is determined that the receiving module 11 receives the instruction information delivered by the network-side device and used to instruct the user terminal to release or no longer apply the interference cancellation parameter, release or no longer apply the interference cancellation parameter; or if it is determined that the receiving module 11 receives the updated interference cancellation parameter delivered by the network-side device, perform the corresponding interference cancellation operation according to the received updated interference cancellation parameter; where in this case, the updated interference cancellation parameter may be an updated interference cancellation parameter delivered to the user terminal when the network-side device determines, according to the interference cancellation result reported by the user terminal, that the interference cancellation effect does not meet the specified condition, or may be an updated interference cancellation parameter delivered to the user terminal after the network-side device obtains the updated interference cancellation parameter from the neighboring network-side device or the core network, and this is not described in this embodiment of the present invention.

Further, it should be noted that, the receiving module 11 may be further configured to receive an RRC message delivered by the network-side device, or receive second instruction information delivered by the network-side device (the second instruction information may be used to indicate that when the user terminal receives an RRC message delivered by the network-side device and determines that the RRC message does not carry the corresponding interference cancellation parameter, the user terminal should release or no longer apply or continue to apply the previously received interference cancellation parameter); and correspondingly, the processing module 12 may be further configured to: after the interference cancellation parameter delivered by the network-side device is received, if it is determined that the receiving module 11 receives the RRC message delivered by the network-side device and it is determined that the RRC message does not carry the corresponding interference cancellation parameter, continue to apply the received interference cancellation parameter according to a specified second interference cancellation parameter application rule (the second interference cancellation parameter application rule may specify that when the user terminal receives the RRC message delivered by the network-side device and determines that the RRC message does not carry the corresponding interference cancellation parameter, the user terminal should release or no longer apply or continue to apply the interference cancellation parameter) or the second instruction information delivered by the network-side device and received by the receiving module 11, or release or no longer apply the received interference cancellation parameter, and this is not limited in this embodiment of the present invention.

Further, it should be noted that, the indication information used to indicate the effective duration of each interference cancellation parameter, or the indication information used to indicate the specific operation content to be performed in the interference cancellation operation, or the interference cancellation result reporting instruction, or the instruction information used to instruct the user terminal to release or no longer apply the interference cancellation parameter, or the like may be transmitted by the network-side device to the user terminal based on a dedicated message, a broadcast message, an RRC message, a MAC layer message, or a physical layer message, or the like. Similarly, the indication information used to indicate that the interference cancellation result is available, or the indication information used to indicate that the interference cancellation result is unavailable, or the like may be transmitted by the user terminal to the network-side device based on a dedicated message, a broadcast message, an RRC message, a MAC layer message, or a physical layer message, or the like. This is not described in this embodiment of the present invention.

Further, it should be noted that, in this embodiment of the present invention, the receiving module 11 may be further configured to receive third instruction information delivered by the network-side device; and the processing module 12 may be further configured to: in the process of performing cell reestablishment or cell handover, continue to apply any one or more of the following dedicated radio resource configuration parameters according to a specified dedicated radio resource configuration parameter application rule or the third instruction information delivered by the network-side device, or release or no longer apply any one or more of the following dedicated radio resource configuration parameters:

an SRB configuration parameter, a DRB configuration parameter, a MAC layer configuration parameter, an SPS configuration parameter, or a dedicated physical layer configuration parameter, or the like.

The SRB configuration parameter may include an SRB identity, an RLC (Radio Link Control, radio link control) configuration, a logical channel configuration, and the like.

The DRB configuration parameter may include an EPS (Evolved Packet System) RAB (Radio Access Bearer) identity, a DRB identity, a PDCP (Packet Data Convergence Protocol) layer configuration, an RLC layer configuration, a logical channel configuration, a logical channel group configuration, and the like.

The MAC layer configuration parameter may include a maximum quantity of HARQ (hybrid automatic repeat request) transmission times, a BSR (Buffer Status Report) related parameter, a DRX (Discontinuous Reception) related parameter, a PHR (Power Headroom Report) related parameter, an SR (Scheduling Request) related parameter, and the like.

The SPS configuration parameter may include an SPS period and the like.

The dedicated physical layer configuration parameter may include dedicated configuration information of a physical channel and the like.

Further, it should be noted that, the dedicated radio resource configuration parameter application rule or the third instruction information may be transmitted by the network-side device to the user terminal (specifically may be the receiving module 11) based on a dedicated message, a broadcast message, an RRC message, a MAC layer message, or a physical layer message, or the like. In addition, the dedicated radio resource configuration parameter application rule may also be preset and fixed in the protocol as a default rule. This is not described in this embodiment of the present invention. It should be noted that, by configuring the corresponding dedicated radio resource configuration parameter application rule or the instruction information, any one or more of the radio resource configuration parameters may be applied more effectively, so that an effect of improving radio resource usage efficiency, reducing signaling overheads, and improving user experience is achieved.

Figure 2:
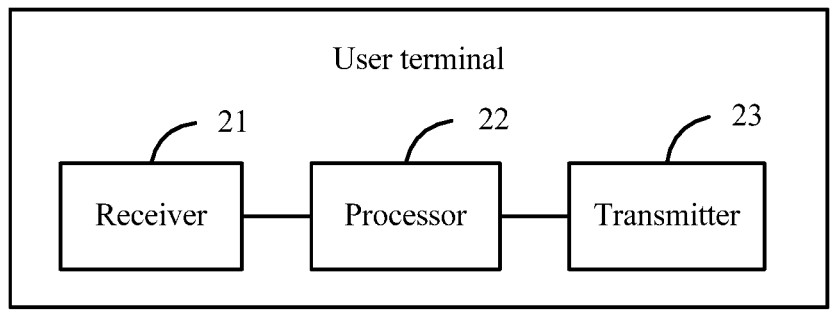
FIG. 2 is a second schematic structural diagram of a user terminal according to Embodiment 1 of the present invention.

Further, Embodiment 1 of the present invention further provides another user terminal (namely, a physical user terminal) that is based on a same inventive concept as the user terminal shown in FIG. 1. As shown in FIG. 2, FIG. 2 is a schematic structural diagram of the another user terminal according to Embodiment 1 of the present invention. The user terminal may include a receiver 21 and a processor 22.

The receiver 21 may be configured to receive an interference cancellation parameter delivered by a network-side device, or may be further configured to receive first instruction information delivered by a network-side device.

The processor 22 may be configured to apply the interference cancellation parameter received by the receiver 21, to perform an interference cancellation operation, and in a process of performing cell reestablishment or cell handover, for any received interference cancellation parameter, continue to apply the interference cancellation parameter to perform an interference cancellation operation according to a specified first interference cancellation parameter application rule or the first instruction information received by the receiver 21, or release or no longer apply the interference cancellation parameter.

Specifically, the interference cancellation parameter received by the receiver 21 may be generally obtained by the network-side device from a neighboring network-side device or a core network. Generally, the neighboring network-side device may be a network-side device that provides a service for a neighboring cell of a serving cell in which the user terminal is located. It may be understood that, the neighboring network-side device and the network-side device may be a same network-side device. This is not described in this embodiment of the present invention.

Further, the interference cancellation parameter received by the receiver 21 may include at least one or more of the following parameters:

a cell identity of the neighboring cell of the serving cell in which the user terminal is located, pilot information of the neighboring cell of the serving cell in which the user terminal is located, a modulation mode of the neighboring cell of the serving cell in which the user terminal is located, a coding mode of the neighboring cell of the serving cell in which the user terminal is located, a transmission mode of the neighboring cell of the serving cell in which the user terminal is located, a precoding matrix of the neighboring cell of the serving cell in which the user terminal is located, a coding rate of the neighboring cell of the serving cell in which the user terminal is located, a power parameter of the neighboring cell of the serving cell in which the user terminal is located, MBSFN configuration information of the neighboring cell of the serving cell in which the user terminal is located, information about a virtual cell ID and an nSCID of the neighboring cell of the serving cell in which the user terminal is located, a TDD configuration parameter used by the neighboring cell of the serving cell in which the user terminal is located, first decision information of the neighboring cell of the serving cell in which the user terminal is located, second decision information of the neighboring cell of the serving cell in which the user terminal is located, third decision information of the neighboring cell of the serving cell in which the user terminal is located, or start symbol information of a PDSCH of the neighboring cell of the serving cell in which the user terminal is located, or the like, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

Further, similar to the foregoing content, the first interference cancellation parameter application rule may be generally transmitted by the network-side device to the user terminal (specifically may be the receiver 21), or may be preset and fixed in a protocol as a default rule. This is not limited in this embodiment of the present invention.

Specifically, the first interference cancellation parameter application rule may include any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

Correspondingly, the processor 22 may be specifically configured to: in the process of performing cell reestablishment or cell handover, continue to apply the received interference cancellation parameter to perform the interference cancellation operation; or specifically configured to, in the process of performing cell reestablishment or cell handover, if it is determined that reestablishment or handover to the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the original serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the target serving cell of the user terminal is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, if it is determined that reestablishment or handover to the neighboring cell of the cell for which the received interference cancellation parameter is configured is required, continue to apply the received interference cancellation parameter to perform the interference cancellation operation, or else, release or no longer apply the interference cancellation parameter; or specifically configured to, in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continue to apply the interference cancellation parameter to perform the interference cancellation operation, or else, release or no longer apply the interference cancellation parameter.

For the any received interference cancellation parameter, the effective duration of the interference cancellation parameter may be transmitted by the network-side device to the user terminal (specifically may be the receiver 21), or may be preset and fixed in the protocol. Specifically, for the any received interference cancellation parameter, when the effective duration of the interference cancellation parameter is transmitted by the network-side device to the user terminal, the network-side device may transmit the effective duration of the interference cancellation parameter to the user terminal by delivering indication information used to indicate the effective duration of the interference cancellation parameter.

That is, in this embodiment of the present invention, the receiver 21 may be further configured to receive indication information that is delivered by the network-side device and used to indicate an effective duration of each interference cancellation parameter. Specifically, the indication information used to indicate the effective duration of each interference cancellation parameter may be generally received by the receiver 21 before the received interference cancellation parameter is applied to perform the interference cancellation operation. This is not described in this embodiment of the present invention.

Further, the neighboring cell of the original serving cell of the user terminal is generally determined by using a neighboring cell list of the original serving cell of the user terminal; and the neighboring cell of the other cell for which the interference cancellation parameter is configured is generally determined by using a neighboring cell list of the other cell for which the interference cancellation parameter is configured. This is similar to the foregoing description. In addition, the neighboring cell list of the original serving cell of the user terminal and the neighboring cell list of the other cell for which the interference cancellation parameter is configured may be generally transmitted by the network-side device to the user terminal (specifically may be the receiver 21). This is not described in this embodiment of the present invention.

It should be noted that, the foregoing execution process is described by using the first interference cancellation parameter application rule to indicate in which cases the interference cancellation parameter may continue to be applied. It may be understood that, the first interference cancellation parameter application rule may be further set for indicating in which cases the corresponding interference cancellation parameter may be released or no longer applied. In this case, the first interference cancellation parameter application rule may specifically include any one or more of the following rules:

releasing or no longer applying the received interference cancellation parameter in the process of performing cell reestablishment or cell handover; or if it is determined that the cell to which reestablishment or handover is required is not the original serving cell of the user terminal, in the process of performing cell reestablishment or cell handover, releasing or no longer applying the received interference cancellation parameter; or if it is determined that the cell to which reestablishment or handover is required is not the neighboring cell of the original serving cell of the user terminal, in the process of performing cell reestablishment or cell handover, releasing or no longer applying the received interference cancellation parameter; or if it is determined that the cell to which reestablishment or handover is required is not the target serving cell of the user terminal, in the process of performing cell reestablishment or cell handover, releasing or no longer applying the received interference cancellation parameter; or if it is determined that the cell to which reestablishment or handover is required is not the cell for which the received interference cancellation parameter is configured, in the process of performing cell reestablishment or cell handover, releasing or no longer applying the received interference cancellation parameter; or if it is determined that the cell to which reestablishment or handover is required is not the neighboring cell of the cell for which the received interference cancellation parameter is configured, in the process of performing cell reestablishment or cell handover, releasing or no longer applying the received interference cancellation parameter; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, releasing or no longer applying the received interference cancellation parameter.

Correspondingly, the processor 22 may be specifically further configured to: in the process of performing cell reestablishment or cell handover, release or no longer apply the received interference cancellation parameter; or in the process of performing cell reestablishment or cell handover, if it is determined that the cell to which reestablishment or handover is required is not the original serving cell of the user terminal, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the neighboring cell of the original serving cell of the user terminal, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the target serving cell of the user terminal, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the cell for which the received interference cancellation parameter is configured, release or no longer apply the received interference cancellation parameter, or else, continue to apply the received interference cancellation parameter to perform the interference cancellation operation; or in the process of performing cell reestablishment or cell handover, if it is determined that the cell to which reestablishment or handover is required is not the neighboring cell of the cell for which the received interference cancellation parameter is configured, release or no longer apply the received interference cancellation parameter, or else, continue to apply the received interference cancellation parameter to perform the interference cancellation operation; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, release or no longer apply the received interference cancellation parameter, or else, continue to apply the received interference cancellation parameter to perform the interference cancellation operation.

Further, the first instruction information received by the receiver 21 may include instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover.

Correspondingly, the processor 22 may be specifically configured to: in the process of performing cell reestablishment or cell handover, for the any received interference cancellation parameter, if it is determined that instruction information delivered by the network-side device and used to instruct the user terminal to continue to apply the interference cancellation parameter in the process of performing cell reestablishment or cell handover is received, continue to apply the interference cancellation parameter to perform the interference cancellation operation; or if it is determined that instruction information delivered by the network-side device and used to instruct the user terminal to release or no longer apply the interference cancellation parameter in the process of performing cell reestablishment or cell handover is received, release or no longer apply the interference cancellation parameter.

Further, it should be noted that, the processor 22 may be specifically configured to apply (or continue to apply) the received interference cancellation parameter to perform any one or more of the following operations:

applying (or continuing to apply) the received interference cancellation parameter to perform interference cancellation on a control channel of the serving cell of the user terminal, where the control channel includes at least any one or more of a PDCCH, an EPDCCH, or a PHICH; or applying (or continuing to apply) the received interference cancellation parameter to perform interference cancellation on a pilot channel of the serving cell of the user terminal, where the pilot channel includes at least any one or more of a CRS, a CSI-RS, a DRS, a PRS, or a DMRS; or applying (or continuing to apply) the received interference cancellation parameter to perform interference cancellation on a data channel of the serving cell of the user terminal, where the data channel includes at least a PDSCH; or applying (or continuing to apply) the received interference cancellation parameter to perform interference cancellation on a synchronization channel of the serving cell of the user terminal, where the synchronization channel includes at least a PSS and/or an SSS; or applying (or continuing to apply) the received interference cancellation parameter to perform a measurement, where the measurement includes at least one or more of an RRM measurement, an RLM measurement, a CQI measurement, or a CSI measurement.

Further, the receiver 21 may be further configured to receive, before the received interference cancellation parameter is applied (or continues to be applied) to perform the interference cancellation operation, indication information delivered by the network-side device and used to indicate specific operation content to be performed in the interference cancellation operation; and the processor 22 may be specifically configured to determine, according to the indication information included in the interference cancellation indication information and used to indicate the specific operation content to be performed in the interference cancellation operation, the specific operation content to be performed in the interference cancellation operation, and apply (or continue to apply), according to the determined specific operation content to be performed in the interference cancellation operation, the received interference cancellation parameter to perform the corresponding interference cancellation operation.

Further, the user terminal may further include a transmitter 23.

The transmitter 23 may be configured to report, to the network-side device when or after the received interference cancellation parameter is applied (or continues to be applied) to perform the interference cancellation operation, an interference cancellation result obtained by applying (or continuing to apply) the received interference cancellation parameter to perform the interference cancellation operation. The interference cancellation result may include at least one or more of the following information: identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation, or the like.

Further, in this embodiment of the present invention, the receiver 21 may be further configured to receive, before the interference cancellation result obtained by applying (continuing to apply) the received interference cancellation parameter to perform the interference cancellation operation is reported to the network-side device, an interference cancellation result reporting instruction delivered by the network-side device.

Correspondingly, the transmitter 23 may be further configured to report, to the network-side device according to the interference cancellation result reporting instruction delivered by the network-side device, the interference cancellation result obtained by applying (continuing to apply) the received interference cancellation parameter to perform the interference cancellation operation.

Certainly, it should be noted that, the transmitter 23 may be further configured to actively report, to the network-side device when or after the received interference cancellation parameter is applied (or continues to be applied) to perform the interference cancellation operation, the interference cancellation result obtained by applying (continuing to apply) the received interference cancellation parameter to perform the interference cancellation operation. This is not described in this embodiment of the present invention.

Further, it should be noted that, the transmitter 23 may be further configured to transmit, to the network-side device before the interference cancellation result obtained by applying (continuing to apply) the received interference cancellation parameter to perform the interference cancellation operation is reported to the network-side device, or before the interference cancellation result reporting instruction delivered by the network-side device is received, indication information used to indicate that the interference cancellation result is available, so that the network-side device may deliver the corresponding interference cancellation result reporting instruction to the user terminal according to the indication information used to indicate that the interference cancellation result is available.

Certainly, it should be noted that, if it is determined that the interference cancellation result is unavailable, the transmitter 23 may be further configured to transmit, to the network-side device, indication information used to indicate that the interference cancellation result is unavailable, so as to reduce signaling consumption caused when the network-side device still delivers the corresponding interference cancellation result reporting instruction to the user terminal and the user terminal still reports the corresponding interference cancellation result to the network-side device.

Further, the receiver 21 may be further configured to: when or after the received interference cancellation parameter is applied (or continues to be applied) to perform the interference cancellation operation, receive instruction information delivered by the network-side device and used to instruct the user terminal to release or no longer apply the interference cancellation parameter, or receive an updated interference cancellation parameter delivered by the network-side device; and the processor 22 may be further configured to: when or after the received interference cancellation parameter is applied to perform the interference cancellation operation, if it is determined that the interference cancellation effect obtained by applying the received interference cancellation parameter to perform the interference cancellation operation does not meet a specified condition, release or no longer apply the interference cancellation parameter; or if it is determined that the receiver 21 receives the instruction information delivered by the network-side device and used to instruct the user terminal to release or no longer apply the interference cancellation parameter, release or no longer apply the interference cancellation parameter; or if it is determined that the receiver 21 receives the updated interference cancellation parameter delivered by the network-side device, perform the corresponding interference cancellation operation according to the received updated interference cancellation parameter.

Further, the receiver 21 may be further configured to receive an RRC message delivered by the network-side device, or receive second instruction information delivered by the network-side device; and the processor 22 may be further configured to: after the interference cancellation parameter delivered by the network-side device is received, if it is determined that the receiver 21 receives the RRC message delivered by the network-side device and it is determined that the RRC message does not carry the corresponding interference cancellation parameter, continue to apply the received interference cancellation parameter according to a specified second interference cancellation parameter application rule or the second instruction information delivered by the network-side device and received by the receiver 21, or release or no longer apply the received interference cancellation parameter.

Further, the receiver 21 may be further configured to receive third instruction information delivered by the network-side device; and the processor 22 may be further configured to: in the process of performing cell reestablishment or cell handover, continue to apply any one or more of the following dedicated radio resource configuration parameters according to a specified dedicated radio resource configuration parameter application rule or the third instruction information delivered by the network-side device, or release or no longer apply any one or more of the following dedicated radio resource configuration parameters:

an SRB configuration parameter, a DRB configuration parameter, a MAC layer configuration parameter, an SPS configuration parameter, or a dedicated physical layer configuration parameter.

Further, it should be noted that, the dedicated radio resource configuration parameter application rule or the third instruction information may be transmitted by the network-side device to the user terminal (specifically may be the receiver 21). In addition, the dedicated radio resource configuration parameter application rule may also be preset and fixed in the protocol as a default rule. This is not described in this embodiment of the present invention.

Further, it should be noted that, the user terminal may further include a memory that is configured to store various types of application program code required when the user terminal performs a corresponding operation. This is not limited in this embodiment of the present invention.

Embodiment 1 of the present invention provides a user terminal. In the technical solution of Embodiment 1 of the present invention, in a process of performing cell reestablishment or cell handover, for any interference cancellation parameter previously received from a network-side device, the user terminal can continue to apply the interference cancellation parameter to perform an interference cancellation operation according to a specified first interference cancellation parameter application rule or first instruction information delivered by the network-side device, or release or no longer apply the interference cancellation parameter. In this way, a currently existing problem that a user terminal cannot know how to process a previously received interference cancellation parameter in a process of performing cell reestablishment or cell handover can be resolved, and further, an objective of improving an interference cancellation effect can be achieved.

Embodiment 2

Figure 3:
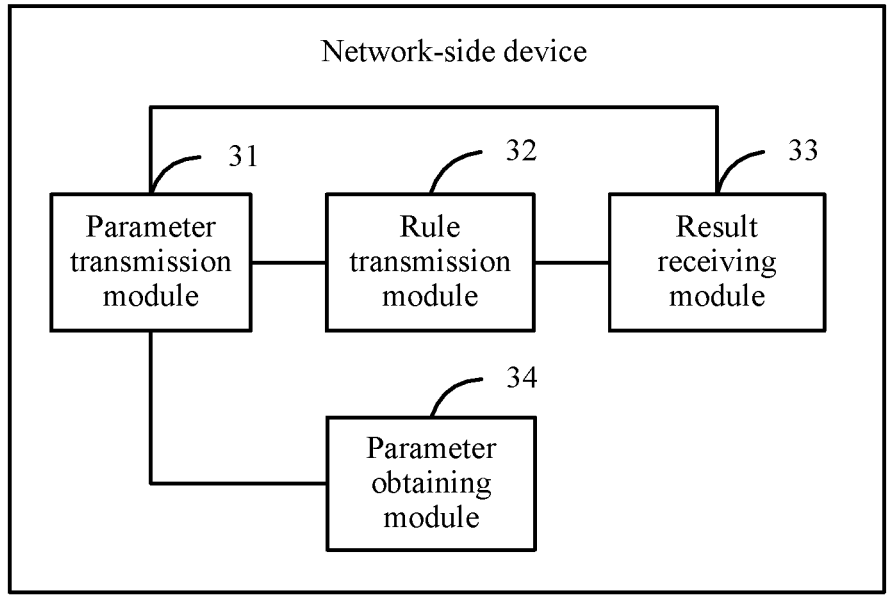
FIG. 3 is a first schematic structural diagram of a network-side device according to Embodiment 2 of the present invention.

Embodiment 2 of the present invention provides a network-side device. The network-side device is not limited to a device such as an RNC (Radio Network Controller), an eNB (Evolved Node B), or a BSC (Base Station Controller). This is not limited in this embodiment of the present invention. Specifically, as shown in FIG. 3, FIG. 3 is a schematic structural diagram of the network-side device in Embodiment 2 of the present invention. The network-side device may include a parameter transmission module 31 and a rule transmission module 32.

The parameter transmission module 31 may be configured to deliver an interference cancellation parameter to a user terminal, so that the user terminal applies the interference cancellation parameter received from the network-side device, to perform an interference cancellation operation.

The rule transmission module 32 may be configured to deliver a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter.

Specifically, the interference cancellation parameter delivered by the parameter transmission module 31 to the user terminal may include at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN configuration information of a neighboring cell of a serving cell in which the user terminal is located, information about a virtual cell ID and an nSCID of a neighboring cell of a serving cell in which the user terminal is located, a TDD configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, or the like, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

Further, the first interference cancellation parameter application rule may include any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

Correspondingly, the rule transmission module 32 may be specifically configured to deliver the first interference cancellation parameter application rule to the user terminal, so that in the process of performing cell reestablishment or cell handover, the user terminal continues to apply the received interference cancellation parameter to perform the interference cancellation operation; or so that in the process of performing cell reestablishment or cell handover, if it is determined that reestablishment or handover to the original serving cell of the user terminal is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the neighboring cell of the original serving cell of the user terminal is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the target serving cell of the user terminal is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the cell for which the received interference cancellation parameter is configured is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the neighboring cell of the cell for which the received interference cancellation parameter is configured is required, the user terminal continues to apply the received interference cancellation parameter to perform the interference cancellation operation, or else, releases or no longer applies the interference cancellation parameter; or so that in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, the user terminal continues to apply the interference cancellation parameter to perform the interference cancellation operation, or else, releases or no longer applies the interference cancellation parameter.

Generally, the first interference cancellation parameter application rule may be transmitted by the rule transmission module 32 to the user terminal based on a dedicated message, a broadcast message, an RRC message, a MAC layer message, or a physical layer message, or the like. This is not described in this embodiment of the present invention.

Further, for the any interference cancellation parameter received by the user terminal, generally, the effective duration of the interference cancellation parameter is also transmitted by the network-side device to the user terminal, for example, may be transmitted by the parameter transmission module 31 to the user terminal based on a dedicated message, a broadcast message, an RRC message, a MAC layer message, or a physical layer message, or the like when or after the interference cancellation parameter is delivered to the user terminal. In addition, for any two or more interference cancellation parameters of a same cell or different cells, effective durations of the interference cancellation parameters and respectively corresponding to the any two or more interference cancellation parameters may be the same or different from each other. This is not limited in this embodiment of the present invention.

Furthermore, the neighboring cell of the original serving cell of the user terminal is generally determined by using a neighboring cell list of the original serving cell of the user terminal; and the neighboring cell of the other cell for which the interference cancellation parameter is configured is generally determined by using a neighboring cell list of the other cell for which the interference cancellation parameter is configured. In addition, the neighboring cell list of the original serving cell of the user terminal and the neighboring cell list of the other cell for which the interference cancellation parameter is configured are also generally transmitted by the network-side device to the user terminal, for example, may be transmitted by the parameter transmission module 31 to the user terminal based on a dedicated message, a broadcast message, an RRC message, a MAC layer message, or a physical layer message, or the like when or after the interference cancellation parameter is delivered to the user terminal. This is also not limited in this embodiment of the present invention.

Further, it should be noted that, the foregoing execution process is described by using the first interference cancellation parameter application rule to indicate in which cases the interference cancellation parameter may continue to be applied. It may be understood that, the first interference cancellation parameter application rule may be further set for indicating in which cases the corresponding interference cancellation parameter may be released or no longer applied. In this case, the first interference cancellation parameter application rule may specifically include any one or more of the following rules:

releasing or no longer applying the received interference cancellation parameter in the process of performing cell reestablishment or cell handover; or if it is determined that the cell to which reestablishment or handover is required is not the original serving cell of the user terminal, in the process of performing cell reestablishment or cell handover, releasing or no longer applying the received interference cancellation parameter; or if it is determined that the cell to which reestablishment or handover is required is not the neighboring cell of the original serving cell of the user terminal, in the process of performing cell reestablishment or cell handover, releasing or no longer applying the received interference cancellation parameter; or if it is determined that the cell to which reestablishment or handover is required is not the target serving cell of the user terminal, in the process of performing cell reestablishment or cell handover, releasing or no longer applying the received interference cancellation parameter; or if it is determined that the cell to which reestablishment or handover is required is not the cell for which the received interference cancellation parameter is configured, in the process of performing cell reestablishment or cell handover, releasing or no longer applying the received interference cancellation parameter; or if it is determined that the cell to which reestablishment or handover is required is not the neighboring cell of the cell for which the received interference cancellation parameter is configured, in the process of performing cell reestablishment or cell handover, releasing or no longer applying the received interference cancellation parameter; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, releasing or no longer applying the received interference cancellation parameter.

Correspondingly, the rule transmission module 32 may be configured to deliver the first interference cancellation parameter application rule to the user terminal, so that in the process of performing cell reestablishment or cell handover, the user terminal releases or no longer applies the received interference cancellation parameter; or so that in the process of performing cell reestablishment or cell handover, if it is determined that the cell to which reestablishment or handover is required is not the original serving cell of the user terminal, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the neighboring cell of the original serving cell of the user terminal, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the target serving cell of the user terminal, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the cell for which the received interference cancellation parameter is configured, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the neighboring cell of the cell for which the received interference cancellation parameter is configured, the user terminal releases or no longer applies the received interference cancellation parameter, or else, continues to apply the received interference cancellation parameter to perform the interference cancellation operation; or so that for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, the user terminal releases or no longer applies the received interference cancellation parameter, or else, continues to apply the received interference cancellation parameter to perform the interference cancellation operation.

Further, the first instruction information may include instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover.

Correspondingly, the rule transmission module 32 may be specifically configured to deliver the first instruction information to the user terminal, so that in the process of performing cell reestablishment or cell handover, for the any received interference cancellation parameter, if instruction information delivered by the network-side device and used to instruct the user terminal to continue to apply the interference cancellation parameter in the process of performing cell reestablishment or cell handover is received, the user terminal may continue to apply the interference cancellation parameter to perform the interference cancellation operation; or so that in the process of performing cell reestablishment or cell handover, for the any received interference cancellation parameter, if instruction information delivered by the network-side device and used to instruct the user terminal to release or no longer apply the interference cancellation parameter in the process of performing cell reestablishment or cell handover is received, the user terminal may release or no longer apply the interference cancellation parameter.

Further, it should be noted that, in this embodiment of the present invention, that the user terminal applies (or continues to apply) the interference cancellation parameter received from the network-side device, to perform an interference cancellation operation may include:

the user terminal applies (or continues to apply) the interference cancellation parameter to perform interference cancellation on a control channel of the serving cell of the user terminal; or the user terminal applies (or continues to apply) the interference cancellation parameter to perform interference cancellation on a pilot channel of the serving cell of the user terminal; or the user terminal applies (or continues to apply) the interference cancellation parameter to perform interference cancellation on a data channel of the serving cell of the user terminal; or the user terminal applies (or continues to apply) the interference cancellation parameter to perform interference cancellation on a synchronization channel of the serving cell of the user terminal; or the user terminal applies (or continues to apply) the interference cancellation parameter to perform a measurement or the like, and this is not described in this embodiment of the present invention.

Further, it should be noted that, in this embodiment of the present invention, the rule transmission module 32 may be further configured to deliver, to the user terminal before the user terminal applies the received interference cancellation parameter to perform the interference cancellation operation (or before the user terminal continues to apply the received interference cancellation parameter to perform the interference cancellation operation), indication information used to indicate specific operation content to be performed in the interference cancellation operation, so that the user terminal determines, according to the indication information included in the interference cancellation indication information and used to indicate the specific operation content to be performed in the interference cancellation operation, the specific operation content to be performed in the interference cancellation operation, and applies (or continues to apply), according to the determined specific operation content to be performed in the interference cancellation operation, the received interference cancellation parameter to perform the corresponding interference cancellation operation.

Further, the network-side device may further include a result receiving module 33.

The result receiving module 33 may be configured to receive an interference cancellation result obtained by applying (continuing to apply) the received interference cancellation parameter to perform the interference cancellation operation and reported by the user terminal. The interference cancellation result may include at least one or more of the following information: identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation, or the like.

It should be noted that, the rule transmission module 32 may be further configured to deliver a corresponding interference cancellation result reporting instruction to the user terminal before the interference cancellation result obtained by applying (or continuing to apply) the received interference cancellation parameter to perform the interference cancellation operation and reported by the user terminal is received, so that the user terminal reports, to the network-side device according to the interference cancellation result reporting instruction delivered by the network-side device, the interference cancellation result obtained by applying (or continuing to apply) the received interference cancellation parameter to perform the interference cancellation operation.

Further, the result receiving module 33 may be further configured to receive, before the corresponding interference cancellation result reporting instruction is delivered to the user terminal, indication information transmitted by the user terminal and used to indicate that the interference cancellation result obtained by applying (or continuing to apply) the received interference cancellation parameter to perform the interference cancellation operation is available, so that the corresponding interference cancellation result reporting instruction may be delivered to the user terminal according to the indication information used to indicate that the interference cancellation result is available.

Further, the rule transmission module 32 may be further configured to deliver, to the user terminal after the interference cancellation result reported by the user terminal is received, if it is determined that the interference cancellation effect obtained by the user terminal by applying (or continuing to apply) the received interference cancellation parameter to perform the interference cancellation operation does not meet a specified condition, instruction information used to instruct the user terminal to release or no longer apply the interference cancellation parameter, so that the user terminal releases or no longer applies the interference cancellation parameter; and the parameter transmission module 31 may be further configured to deliver, after the interference cancellation result reported by the user terminal is received, an updated interference cancellation parameter to the user terminal if it is determined that the interference cancellation effect obtained by the user terminal by applying the received interference cancellation parameter to perform the interference cancellation operation does not meet the specified condition, so that the user terminal performs the corresponding interference cancellation operation according to the updated interference cancellation parameter.

Further, the rule transmission module 32 may be further configured to deliver a specified second interference cancellation parameter application rule or second instruction information to the user terminal when or after the interference cancellation parameter is delivered to the user terminal, so that when the user terminal receives an RRC message delivered by the network-side device and determines that the RRC message does not carry the corresponding interference cancellation parameter, the user terminal continues to apply the previously received interference cancellation parameter according to the second interference cancellation parameter application rule or the second instruction information, or releases or no longer applies the previously received interference cancellation parameter.

Further, the rule transmission module 32 may be further configured to deliver a specified dedicated radio resource configuration parameter application rule or third instruction information to the user terminal, so that in the process of performing cell reestablishment or cell handover, the user terminal continues to apply any one or more of the following dedicated radio resource configuration parameters according to the dedicated radio resource configuration parameter application rule or the third instruction information, or releases or no longer applies any one or more of the following dedicated radio resource configuration parameters: an SRB configuration parameter, a DRB configuration parameter, a MAC layer configuration parameter, an SPS configuration parameter, or a dedicated physical layer configuration parameter.

Further, the network-side device may further include a parameter obtaining module 34.

The parameter obtaining module 34 may be configured to obtain the corresponding interference cancellation parameter from a neighboring network-side device or a core network before the interference cancellation parameter is delivered to the user terminal, where the neighboring network-side device is a network-side device that provides a service for the neighboring cell of the serving cell in which the user terminal is located. This is not described in this embodiment of the present invention.

Figure 4:
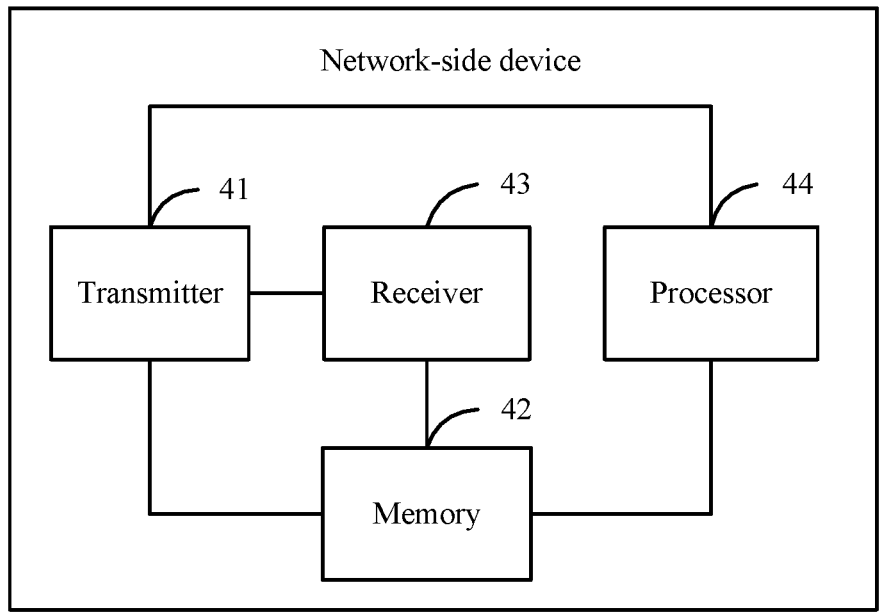
FIG. 4 is a second schematic structural diagram of a network-side device according to Embodiment 2 of the present invention.

Further, Embodiment 2 of the present invention further provides another network-side device (namely, a physical network-side device) that is based on a same inventive concept as the network-side device shown in FIG. 3. As shown in FIG. 4, FIG. 4 is a schematic structural diagram of the another network-side device according to Embodiment 2 of the present invention. The network-side device may include a transmitter 41 and a memory 42 that is configured to store various types of application program code required when the network-side device performs a corresponding operation.

The transmitter 41 may be configured to: deliver an interference cancellation parameter to a user terminal, so that the user terminal applies the interference cancellation parameter received from the network-side device, to perform an interference cancellation operation; and deliver a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter.

Specifically, the interference cancellation parameter delivered by the transmitter 41 to the user terminal may include at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, MBSFN configuration information of a neighboring cell of a serving cell in which the user terminal is located, information about a virtual cell ID and an nSCID of a neighboring cell of a serving cell in which the user terminal is located, a TDD configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a PDSCH of a neighboring cell of a serving cell in which the user terminal is located, or the like, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

Further, the first interference cancellation parameter application rule transmitted by the transmitter 41 may include any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

Generally, the first interference cancellation parameter application rule may be transmitted by the transmitter 41 to the user terminal based on a dedicated message, a broadcast message, an RRC message, a MAC layer message, or a physical layer message, or the like. This is not described in this embodiment of the present invention.

Further, for the any interference cancellation parameter received by the user terminal, generally, the effective duration of the interference cancellation parameter is also transmitted by the network-side device to the user terminal, for example, may be transmitted by the transmitter 41 to the user terminal based on a dedicated message, a broadcast message, an RRC message, a MAC layer message, or a physical layer message, or the like when or after the interference cancellation parameter is delivered to the user terminal. In addition, for any two or more interference cancellation parameters of a same cell or different cells, effective durations of the interference cancellation parameters and respectively corresponding to the any two or more interference cancellation parameters may be the same or different from each other. This is not limited in this embodiment of the present invention.

Furthermore, the neighboring cell of the original serving cell of the user terminal is generally determined by using a neighboring cell list of the original serving cell of the user terminal; and the neighboring cell of the other cell for which the interference cancellation parameter is configured is generally determined by using a neighboring cell list of the other cell for which the interference cancellation parameter is configured. In addition, the neighboring cell list of the original serving cell of the user terminal and the neighboring cell list of the other cell for which the interference cancellation parameter is configured are also generally transmitted by the network-side device to the terminal, for example, may be transmitted by the transmitter 41 to the user terminal based on a dedicated message, a broadcast message, an RRC message, a MAC layer message, or a physical layer message, or the like when or after the interference cancellation parameter is delivered to the user terminal. This is also not limited in this embodiment of the present invention.

Further, it should be noted that, the foregoing execution process is described by using the first interference cancellation parameter application rule to indicate in which cases the interference cancellation parameter may continue to be applied. It may be understood that, the first interference cancellation parameter application rule may be further set for indicating in which cases the corresponding interference cancellation parameter may be released or no longer applied. In this case, the first interference cancellation parameter application rule transmitted by the transmitter 41 may specifically include any one or more of the following rules:

releasing or no longer applying the received interference cancellation parameter in the process of performing cell reestablishment or cell handover; or if it is determined that the cell to which reestablishment or handover is required is not the original serving cell of the user terminal, in the process of performing cell reestablishment or cell handover, releasing or no longer applying the received interference cancellation parameter; or if it is determined that the cell to which reestablishment or handover is required is not the neighboring cell of the original serving cell of the user terminal, in the process of performing cell reestablishment or cell handover, releasing or no longer applying the received interference cancellation parameter; or if it is determined that the cell to which reestablishment or handover is required is not the target serving cell of the user terminal, in the process of performing cell reestablishment or cell handover, releasing or no longer applying the received interference cancellation parameter; or if it is determined that the cell to which reestablishment or handover is required is not the cell for which the received interference cancellation parameter is configured, in the process of performing cell reestablishment or cell handover, releasing or no longer applying the received interference cancellation parameter; or if it is determined that the cell to which reestablishment or handover is required is not the neighboring cell of the cell for which the received interference cancellation parameter is configured, in the process of performing cell reestablishment or cell handover, releasing or no longer applying the received interference cancellation parameter; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, releasing or no longer applying the received interference cancellation parameter.

Further, the first instruction information transmitted by the transmitter 41 may include instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover. This is not described in this embodiment of the present invention.

Further, it should be noted that, in this embodiment of the present invention, the transmitter 41 may be further configured to deliver, to the user terminal before the user terminal applies the received interference cancellation parameter to perform the interference cancellation operation (or before the user terminal continues to apply the received interference cancellation parameter to perform the interference cancellation operation), indication information used to indicate specific operation content to be performed in the interference cancellation operation, so that the user terminal determines, according to the indication information included in the interference cancellation indication information and used to indicate the specific operation content to be performed in the interference cancellation operation, the specific operation content to be performed in the interference cancellation operation, and applies (or continues to apply), according to the determined specific operation content to be performed in the interference cancellation operation, the received interference cancellation parameter to perform the corresponding interference cancellation operation.

Further, the network-side device may further include a receiver 43.

The receiver 43 may be configured to receive an interference cancellation result obtained by applying (or continuing to apply) the received interference cancellation parameter to perform the interference cancellation operation and reported by the user terminal. The interference cancellation result may include at least one or more of the following information: identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation, or the like.

Further, it should be noted that, the transmitter 41 may be further configured to deliver a corresponding interference cancellation result reporting instruction to the user terminal before the interference cancellation result obtained by applying (or continuing to apply) the received interference cancellation parameter to perform the interference cancellation operation and reported by the user terminal is received, so that the user terminal reports, to the network-side device according to the interference cancellation result reporting instruction delivered by the network-side device, the interference cancellation result obtained by applying (or continuing to apply) the received interference cancellation parameter to perform the interference cancellation operation.

Further, the receiver 43 may be further configured to receive, before the corresponding interference cancellation result reporting instruction is delivered to the user terminal, indication information transmitted by the user terminal and used to indicate that the interference cancellation result obtained by applying (or continuing to apply) the received interference cancellation parameter to perform the interference cancellation operation is available, so that the corresponding interference cancellation result reporting instruction may be delivered to the user terminal according to the indication information used to indicate that the interference cancellation result is available.

Further, the transmitter 41 may be further configured to: after the interference cancellation result reported by the user terminal is received, if it is determined that the interference cancellation effect obtained by the user terminal by applying (or continuing to apply) the received interference cancellation parameter to perform the interference cancellation operation does not meet a specified condition, deliver, to the user terminal, instruction information used to instruct the user terminal to release or no longer apply the interference cancellation parameter, so that the user terminal releases or no longer applies the interference cancellation parameter; or deliver an updated interference cancellation parameter to the user terminal, so that the user terminal performs the corresponding interference cancellation operation according to the updated interference cancellation parameter.

Further, the transmitter 41 may be further configured to deliver a specified second interference cancellation parameter application rule or second instruction information to the user terminal when or after the interference cancellation parameter is delivered to the user terminal, so that when the user terminal receives an RRC message delivered by the network-side device and determines that the RRC message does not carry the corresponding interference cancellation parameter, the user terminal continues to apply the previously received interference cancellation parameter according to the second interference cancellation parameter application rule or the second instruction information, or releases or no longer applies the previously received interference cancellation parameter.

Further, the transmitter 41 may be further configured to deliver a specified dedicated radio resource configuration parameter application rule or third instruction information to the user terminal, so that in the process of performing cell reestablishment or cell handover, the user terminal continues to apply any one or more of the following dedicated radio resource configuration parameters according to the dedicated radio resource configuration parameter application rule or the third instruction information, or releases or no longer applies any one or more of the following dedicated radio resource configuration parameters: an SRB configuration parameter, a DRB configuration parameter, a MAC layer configuration parameter, an SPS configuration parameter, or a dedicated physical layer configuration parameter.

Further, the network-side device may further include a processor 44.

The processor 44 may be configured to obtain the corresponding interference cancellation parameter from a neighboring network-side device or a core network before the interference cancellation parameter is delivered to the user terminal, where the neighboring network-side device is a network-side device that provides a service for the neighboring cell of the serving cell in which the user terminal is located. This is not described in this embodiment of the present invention.

Embodiment 2 of the present invention provides a network-side device. In the technical solution of Embodiment 2 of the present invention, the network-side device may deliver an interference cancellation parameter to a user terminal, so that the user terminal applies the interference cancellation parameter received from the network-side device, to perform an interference cancellation operation; and the network-side device may further deliver a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter. In this way, a currently existing problem that a user terminal cannot know how to process a previously received interference cancellation parameter in a process of performing cell reestablishment or cell handover can be resolved, and further, an objective of improving an interference cancellation effect can be achieved.

Embodiment 3

Figure 5:
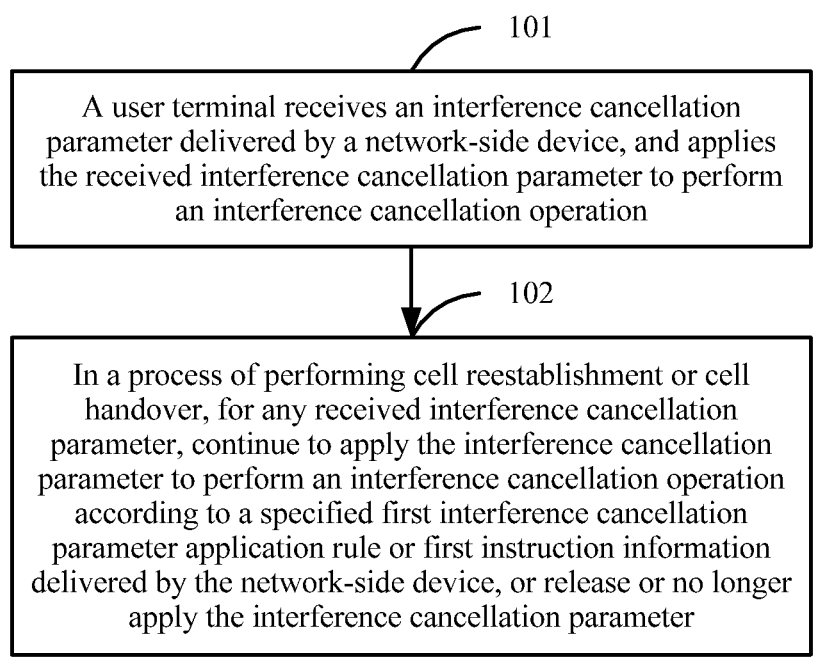
FIG. 5 is a schematic flowchart of an interference cancellation method according to Embodiment 3 of the present invention.

Embodiment 3 of the present invention provides an interference cancellation method that may be applied to the user terminal in Embodiment 1 of the present invention. As shown in FIG. 5, FIG. 5 is a schematic flowchart of the interference cancellation method according to Embodiment 3 of the present invention. The interference cancellation method may include the following steps:

Step 101: A user terminal receives an interference cancellation parameter delivered by a network-side device, and applies the received interference cancellation parameter to perform an interference cancellation operation.

Specifically, the interference cancellation parameter received by the user terminal may be generally obtained by the network-side device from a neighboring network-side device or a core network. Generally, the neighboring network-side device may be a network-side device that provides a service for a neighboring cell of a serving cell in which the user terminal is located.

Further, the interference cancellation parameter received by the user terminal may include at least one or more of the following parameters:

a cell identity of the neighboring cell of the serving cell in which the user terminal is located, pilot information of the neighboring cell of the serving cell in which the user terminal is located, a modulation mode of the neighboring cell of the serving cell in which the user terminal is located, a coding mode of the neighboring cell of the serving cell in which the user terminal is located, a transmission mode of the neighboring cell of the serving cell in which the user terminal is located, a precoding matrix of the neighboring cell of the serving cell in which the user terminal is located, a coding rate of the neighboring cell of the serving cell in which the user terminal is located, a power parameter of the neighboring cell of the serving cell in which the user terminal is located, MBSFN configuration information of the neighboring cell of the serving cell in which the user terminal is located, information about a virtual cell ID and an nSCID of the neighboring cell of the serving cell in which the user terminal is located, a TDD configuration parameter used by the neighboring cell of the serving cell in which the user terminal is located, first decision information of the neighboring cell of the serving cell in which the user terminal is located, second decision information of the neighboring cell of the serving cell in which the user terminal is located, third decision information of the neighboring cell of the serving cell in which the user terminal is located, or start symbol information of a PDSCH of the neighboring cell of the serving cell in which the user terminal is located, or the like, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

Alternatively, the foregoing interference cancellation parameters may also be interference cancellation parameters of the serving cell in which the user terminal is located, that is, the interference cancellation parameters received by the user terminal may further include each interference cancellation parameter related to the serving cell in which the user terminal is located, in addition to each interference cancellation parameter related to the neighboring cell of the serving cell in which the user terminal is located.

Specifically, when the received interference cancellation parameter is an interference cancellation parameter of the serving cell in which the user terminal is located, the received interference cancellation parameter may further include:

an identity of at least another user terminal paired with the user terminal in performing multi-user MIMO, for example, one or more of a C-RNTI or an S-TMSI. The identity may assist the user terminal in better eliminating an interference signal of the another user terminal. For example, the user terminal may decode a scheduling command and data of the another user terminal according to the identity of the another user terminal, and then eliminate the scheduling command and data. This is not limited in the present invention.

Further, in this embodiment of the present invention, after receiving the interference cancellation parameter delivered by the network-side device, the user terminal may apply the received interference cancellation parameter to perform the interference cancellation operation. Specifically, the applying the received interference cancellation parameter to perform an interference cancellation operation may include any one or more of the following operations:

applying the received interference cancellation parameter to perform interference cancellation on a control channel of the serving cell of the user terminal, where the control channel includes at least any one or more of a PDCCH, an EPDCCH, or a PHICH; or applying the received interference cancellation parameter to perform interference cancellation on a pilot channel of the serving cell of the user terminal, where the pilot channel includes at least any one or more of a CRS, a CSI-RS, a DRS, a PRS, or a DMRS; or applying the received interference cancellation parameter to perform interference cancellation on a data channel of the serving cell of the user terminal, where the data channel includes at least a PDSCH; or applying the received interference cancellation parameter to perform interference cancellation on a synchronization channel of the serving cell of the user terminal, where the synchronization channel includes at least a PSS and/or an SSS; or applying the received interference cancellation parameter to perform a measurement, where the measurement includes at least one or more of an RRM measurement, an RLM measurement, a CQI measurement, or a CSI measurement.

Further, in this embodiment of the present invention, before the applying the received interference cancellation parameter to perform an interference cancellation operation, the method may further include:

receiving indication information delivered by the network-side device and used to indicate an effective duration of each interference cancellation parameter, where for any two or more interference cancellation parameters of a same cell or different cells, effective durations of the interference cancellation parameters and respectively corresponding to the any two or more interference cancellation parameters may be the same or different from each other.

In addition, it should be noted that, for any received interference cancellation parameter, the effective duration of the interference cancellation parameter may be transmitted by the network-side device to the user terminal, or may be preset and fixed in a protocol. This is not limited in this embodiment of the present invention.

Furthermore, it should be noted that, particularly, for the any received interference cancellation parameter, when the effective duration that is of the interference cancellation parameter and matches the interference cancellation parameter and is delivered by the network-side device is not received (or the effective duration that is of the interference cancellation parameter and matches the interference cancellation parameter is not preset), or a value of the received effective duration that is of the interference cancellation parameter and matches the interference cancellation parameter is a null value or infinite (or a value of the preset effective duration that is of the interference cancellation parameter and matches the interference cancellation parameter is a null value or infinite), or the like, the interference cancellation parameter may be always effective, until the user terminal returns to an idle state, or until instruction information delivered by the network-side device and used to instruct the user terminal to release or no longer apply the interference cancellation parameter is received. Herein the instruction information may be explicit instruction information, or implicit instruction information. This is also not limited in this embodiment of the present invention.

Correspondingly, the applying the received interference cancellation parameter to perform an interference cancellation operation may include:

for the any received interference cancellation parameter, if it is determined, according to the effective duration of the interference cancellation parameter and matching the interference cancellation parameter, that a forthcoming process of applying the interference cancellation parameter to perform an interference cancellation operation occurs within the effective duration of the interference cancellation parameter, applying the interference cancellation parameter to perform the interference cancellation operation, where when it is determined that a time period corresponding to the forthcoming process of applying the interference cancellation parameter to perform the interference cancellation operation is within a time period corresponding to the effective duration of the interference cancellation parameter, it may be determined that the forthcoming process of applying the interference cancellation parameter to perform the interference cancellation operation occurs within the effective duration of the interference cancellation parameter.

Further, in this embodiment of the present invention, before the applying the received interference cancellation parameter to perform an interference cancellation operation, the method may further include:

receiving indication information delivered by the network-side device and used to indicate specific operation content to be performed in the interference cancellation operation.

Correspondingly, the applying the received interference cancellation parameter to perform an interference cancellation operation may include:

determining, according to the indication information included in the interference cancellation indication information and used to indicate the specific operation content to be performed in the interference cancellation operation, the specific operation content to be performed in the interference cancellation operation, and applying the received interference cancellation parameter to perform the corresponding interference cancellation operation according to the determined specific operation content to be performed in the interference cancellation operation.

Further, in this embodiment of the present invention, when or after the applying the received interference cancellation parameter to perform an interference cancellation operation, the method may further include:

reporting, to the network-side device, an interference cancellation result obtained by applying the received interference cancellation parameter to perform the interference cancellation operation, so that the network-side device performs an operation such as interference cancellation parameter optimization, or resource management optimization, or configuration optimization according to the received interference cancellation result.

Specifically, the interference cancellation result may include at least one or more of the following information: identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation, or the like. This is not limited in this embodiment of the present invention. The information about the interference cancellation effect corresponding to the interference cancellation operation may be information about a qualitative parameter such as good or poor, or may be information about a quantitative parameter such as a percentage. This is also not limited in this embodiment of the present invention.

Further, it should be noted that, before the reporting, to the network-side device, an interference cancellation result obtained by applying the received interference cancellation parameter to perform the interference cancellation operation, the method may further include:

receiving an interference cancellation result reporting instruction delivered by the network-side device.

Correspondingly, the reporting, to the network-side device, an interference cancellation result obtained by applying the received interference cancellation parameter to perform the interference cancellation operation, may include: reporting, to the network-side device according to the interference cancellation result reporting instruction delivered by the network-side device, the interference cancellation result obtained by applying the received interference cancellation parameter to perform the interference cancellation operation.

Certainly, it should be noted that, the user terminal may further actively report, to the network-side device when or after the received interference cancellation parameter is applied to perform the interference cancellation operation, the interference cancellation result obtained by applying the received interference cancellation parameter to perform the interference cancellation operation. This is not described in this embodiment of the present invention.

Further, it should be noted that, before the reporting, to the network-side device, an interference cancellation result obtained by applying the received interference cancellation parameter to perform the interference cancellation operation, or before the receiving an interference cancellation result reporting instruction delivered by the network-side device, the method may further include:

transmitting, to the network-side device, indication information used to indicate that the interference cancellation result is available, so that the network-side device may deliver the corresponding interference cancellation result reporting instruction to the user terminal according to the indication information used to indicate that the interference cancellation result is available.

Certainly, it should be noted that, if it is determined that the interference cancellation result is unavailable, the user terminal may transmit, to the network-side device, indication information used to indicate that the interference cancellation result is unavailable, so as to reduce signaling consumption caused when the network-side device still delivers the corresponding interference cancellation result reporting instruction to the user terminal and the user terminal still reports the corresponding interference cancellation result to the network-side device.

Further, it should be noted that, when or after the applying the received interference cancellation parameter to perform an interference cancellation operation, the method may further include:

if it is determined that the interference cancellation effect obtained by applying the received interference cancellation parameter to perform the interference cancellation operation does not meet a specified condition (for example, it is determined that the interference cancellation effect corresponding to the interference cancellation operation is lower than a specified threshold), releasing or no longer applying the interference cancellation parameter, so as to reduce processing complexity of the user terminal; or if instruction information delivered by the network-side device and used to instruct the user terminal to release or no longer apply the interference cancellation parameter is received, releasing or no longer applying the interference cancellation parameter; or if an updated interference cancellation parameter delivered by the network-side device is received, performing the corresponding interference cancellation operation according to the received updated interference cancellation parameter; where in this case, the updated interference cancellation parameter may be an updated interference cancellation parameter delivered to the user terminal when the network-side device determines, according to the interference cancellation result reported by the user terminal, that the interference cancellation effect does not meet the specified condition, or may be an updated interference cancellation parameter delivered to the user terminal after the network-side device obtains the updated interference cancellation parameter from the neighboring network-side device or the core network, and this is not described in this embodiment of the present invention.

Further, it should be noted that, after the interference cancellation parameter delivered by the network-side device is received, the method may further include the following step:

if an RRC message (for example, a handover message or other RRC reconfiguration messages for configuring physical resource parameters or configuring radio bearer parameters) delivered by the network-side device is received, and it is determined that the RRC message does not carry the corresponding interference cancellation parameter, releasing or no longer applying the previously received interference cancellation parameter according to a specified second interference cancellation parameter application rule (the second interference cancellation parameter application rule may specify that the user terminal should release or no longer apply or continue to apply the interference cancellation parameter in this case) or second instruction information (the second instruction information may indicate that the user terminal should release or no longer apply or continue to apply the interference cancellation parameter in this case) delivered by the network-side device, or continuing to apply the previously received interference cancellation parameter. This is not limited in this embodiment of the present invention.

Further, it should be noted that, in this embodiment of the present invention, because the user terminal may exchange information with the network-side device based on at least one or more of a dedicated message, a broadcast message, an RRC message, a MAC layer message, or a physical layer message, the indication information used to indicate the effective duration of each interference cancellation parameter, or the indication information used to indicate the specific operation content to be performed in the interference cancellation operation, or the interference cancellation result reporting instruction, or the instruction information used to instruct the user terminal to release or no longer apply the interference cancellation parameter, or the like may be transmitted by the network-side device to the user terminal based on a dedicated message, a broadcast message, an RRC message, a MAC layer message, or a physical layer message, or the like. Similarly, the indication information used to indicate that the interference cancellation result is available, or the indication information used to indicate that the interference cancellation result is unavailable, or the like may be transmitted by the user terminal to the network-side device based on a dedicated message, a broadcast message, an RRC message, a MAC layer message, or a physical layer message, or the like. This is not described in this embodiment of the present invention.

Furthermore, it should be noted that, step 101 may be implemented independently, or may be implemented in combination with a subsequent step. This is not limited in this embodiment of the present invention.

Step 102: In a process of performing cell reestablishment or cell handover, for any received interference cancellation parameter, continue to apply the interference cancellation parameter to perform an interference cancellation operation according to a specified first interference cancellation parameter application rule or first instruction information delivered by the network-side device, or release or no longer apply the interference cancellation parameter.

Specifically, the first interference cancellation parameter application rule may be generally transmitted by the network-side device to the user terminal, for example, may be transmitted by the network-side device to the user terminal based on a dedicated message, a broadcast message, an RRC message, a MAC layer message, or a physical layer message, or the like, or may be preset and fixed in the protocol as a default rule. This is not limited in this embodiment of the present invention. In addition, it should be noted that, in this embodiment of the present invention, the involved one or more interference cancellation parameter application rules (for example, the first interference cancellation parameter application rule and the second interference cancellation parameter application rule) may be a same rule or different rules. This is also not limited in this embodiment of the present invention.

Further, the first interference cancellation parameter application rule may specifically include any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation, where when it is determined that a time period corresponding to the process of cell reestablishment or cell handover is within a time period corresponding to the effective duration of the interference cancellation parameter, it may be determined that the process of cell reestablishment or cell handover occurs within the effective duration of the interference cancellation parameter.

Specifically, as described in the foregoing step 101, for the any received interference cancellation parameter, the effective duration of the interference cancellation parameter may be transmitted by the network-side device to the user terminal, or may be preset and fixed in the protocol. This is not limited in this embodiment of the present invention.

Furthermore, the neighboring cell of the original serving cell of the user terminal is generally determined by using a neighboring cell list of the original serving cell of the user terminal; and the neighboring cell of the other cell for which the interference cancellation parameter is configured is generally determined by using a neighboring cell list of the other cell for which the interference cancellation parameter is configured. In addition, the neighboring cell list of the original serving cell of the user terminal and the neighboring cell list of the other cell for which the interference cancellation parameter is configured may be generally transmitted by the network-side device to the terminal. Furthermore, it should be noted that, the neighboring cell list of the original serving cell of the user terminal and the neighboring cell list of the other cell for which the interference cancellation parameter is configured may be generally transmitted by the network-side device to the user terminal based on a dedicated message, a broadcast message, an RRC message, a MAC layer message, or a physical layer message, or the like. This is not described in this embodiment of the present invention.

Correspondingly, the in a process of performing cell reestablishment or cell handover, for any received interference cancellation parameter, continuing to apply the interference cancellation parameter to perform an interference cancellation operation according to a specified first interference cancellation parameter application rule, or releasing or no longer applying the interference cancellation parameter, may include:

in the process of performing cell reestablishment or cell handover, continuing to apply the received interference cancellation parameter to perform the interference cancellation operation; or in the process of performing cell reestablishment or cell handover, if it is determined that reestablishment or handover to the original serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the neighboring cell of the original serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the target serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the cell for which the received interference cancellation parameter is configured is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the neighboring cell of the cell for which the received interference cancellation parameter is configured is required, continuing to apply the received interference cancellation parameter to perform the interference cancellation operation, or else, releasing or no longer applying the interference cancellation parameter; or in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continuing to apply the interference cancellation parameter to perform the interference cancellation operation, or else, releasing or no longer applying the interference cancellation parameter.

It should be noted that, the foregoing execution process is described by using the first interference cancellation parameter application rule to indicate in which cases the interference cancellation parameter may continue to be applied. It may be understood that, the first interference cancellation parameter application rule may be further set for indicating in which cases the corresponding interference cancellation parameter may be released or no longer applied. In this case, the first interference cancellation parameter application rule may specifically include any one or more of the following rules:

releasing or no longer applying the received interference cancellation parameter in the process of performing cell reestablishment or cell handover; or if it is determined that the cell to which reestablishment or handover is required is not the original serving cell of the user terminal, in the process of performing cell reestablishment or cell handover, releasing or no longer applying the received interference cancellation parameter; or if it is determined that the cell to which reestablishment or handover is required is not the neighboring cell of the original serving cell of the user terminal, in the process of performing cell reestablishment or cell handover, releasing or no longer applying the received interference cancellation parameter; or if it is determined that the cell to which reestablishment or handover is required is not the target serving cell of the user terminal, in the process of performing cell reestablishment or cell handover, releasing or no longer applying the received interference cancellation parameter; or if it is determined that the cell to which reestablishment or handover is required is not the cell for which the received interference cancellation parameter is configured, in the process of performing cell reestablishment or cell handover, releasing or no longer applying the received interference cancellation parameter; or if it is determined that the cell to which reestablishment or handover is required is not the neighboring cell of the cell for which the received interference cancellation parameter is configured, in the process of performing cell reestablishment or cell handover, releasing or no longer applying the received interference cancellation parameter; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, releasing or no longer applying the received interference cancellation parameter.

Correspondingly, the in a process of performing cell reestablishment or cell handover, for any received interference cancellation parameter, continuing to apply the interference cancellation parameter to perform an interference cancellation operation according to a specified first interference cancellation parameter application rule, or releasing or no longer applying the interference cancellation parameter, may include:

releasing or no longer applying the received interference cancellation parameter in the process of performing cell reestablishment or cell handover; or in the process of performing cell reestablishment or cell handover, if it is determined that the cell to which reestablishment or handover is required is not the original serving cell of the user terminal, releasing or no longer applying the received interference cancellation parameter, or else, continuing to apply the received interference cancellation parameter to perform the interference cancellation operation; or in the process of performing cell reestablishment or cell handover, if it is determined that the cell to which reestablishment or handover is required is not the neighboring cell of the original serving cell of the user terminal, releasing or no longer applying the received interference cancellation parameter, or else, continuing to apply the received interference cancellation parameter to perform the interference cancellation operation; or in the process of performing cell reestablishment or cell handover, if it is determined that the cell to which reestablishment or handover is required is not the target serving cell of the user terminal, releasing or no longer applying the received interference cancellation parameter, or else, continuing to apply the received interference cancellation parameter to perform the interference cancellation operation; or in the process of performing cell reestablishment or cell handover, if it is determined that the cell to which reestablishment or handover is required is not the cell for which the received interference cancellation parameter is configured, releasing or no longer applying the received interference cancellation parameter, or else, continuing to apply the received interference cancellation parameter to perform the interference cancellation operation; or in the process of performing cell reestablishment or cell handover, if it is determined that the cell to which reestablishment or handover is required is not the neighboring cell of the cell for which the received interference cancellation parameter is configured, releasing or no longer applying the received interference cancellation parameter, or else, continuing to apply the received interference cancellation parameter to perform the interference cancellation operation; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, releasing or no longer applying the received interference cancellation parameter, or else, continue to apply the received interference cancellation parameter to perform the interference cancellation operation.

Further, in this embodiment of the present invention, the first instruction information may include instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover. In addition, generally, the first instruction information may be obtained before the process of performing cell reestablishment or cell handover by the user terminal. This is not described in this embodiment of the present invention.

Correspondingly, the in a process of performing cell reestablishment or cell handover, for any received interference cancellation parameter, continuing to apply the interference cancellation parameter to perform an interference cancellation operation according to first instruction information delivered by the network-side device, or releasing or no longer applying the interference cancellation parameter, may include:

in the process of performing cell reestablishment or cell handover, for the any received interference cancellation parameter, if instruction information delivered by the network-side device and used to instruct the user terminal to continue to apply the interference cancellation parameter in the process of performing cell reestablishment or cell handover is received, continuing to apply the interference cancellation parameter to perform the interference cancellation operation; or if instruction information delivered by the network-side device and used to instruct the user terminal to release or no longer apply the interference cancellation parameter in the process of performing cell reestablishment or cell handover is received, releasing or no longer applying the interference cancellation parameter.

It should be noted that, for any two or more received interference cancellation parameters, instruction information corresponding to the any two or more interference cancellation parameters and used to instruct the user terminal to continue to apply the corresponding interference cancellation parameters in the process of performing cell reestablishment or cell handover may be same instruction information or may be different instruction information. Preferably, to save network transmission resources and improve transmission efficiency, the instruction information corresponding to the any two or more interference cancellation parameters and used to instruct the user terminal to continue to apply the corresponding interference cancellation parameters in the process of performing cell reestablishment or cell handover may be generally the same instruction information. That is, the network-side device may indicate, by delivering the same instruction information to the user terminal, which interference cancellation parameters may continue to be applied in the process of performing cell reestablishment or cell handover. For example, the same instruction information is used to instruct the user terminal to continue to apply all of the previously configured interference cancellation parameters in the process of performing cell reestablishment or cell handover. This is not described in this embodiment of the present invention.

Similarly, for the any two or more received interference cancellation parameters, instruction information corresponding to the any two or more interference cancellation parameters and used to instruct the user terminal to release or no longer apply the corresponding interference cancellation parameters in the process of performing cell reestablishment or cell handover may be same instruction information or may be different instruction information. This is also not described in this embodiment of the present invention.

Furthermore, as described in the foregoing step 101, in this embodiment of the present invention, the user terminal may exchange information with the network-side device based on at least one or more of a dedicated message, a broadcast message, an RRC message, a MAC layer message, or a physical layer message. Therefore, the first instruction information may also be generally transmitted by the network-side device to the user terminal based on a dedicated message, a broadcast message, an RRC message, a MAC layer message, or a physical layer message, or the like. This is not described in this embodiment of the present invention.

Further, in this embodiment of the present invention, similar to the process of applying the interference cancellation parameter in step 101, the in a process of performing cell reestablishment or cell handover, for any received interference cancellation parameter, continuing to apply the interference cancellation parameter to perform an interference cancellation operation, may include any one or more of the following operations:

continuing to apply the interference cancellation parameter to perform interference cancellation on a control channel of the serving cell of the user terminal; or continuing to apply the interference cancellation parameter to perform interference cancellation on a pilot channel of the serving cell of the user terminal; or continuing to apply the interference cancellation parameter to perform interference cancellation on a data channel of the serving cell of the user terminal; or continuing to apply the interference cancellation parameter to perform interference cancellation on a synchronization channel of the serving cell of the user terminal; or continuing to apply the interference cancellation parameter to perform a measurement, or the like.

Correspondingly, similar to the process described in step 101, before the continuing to apply the received interference cancellation parameter to perform an interference cancellation operation, the method may further include:

receiving indication information delivered by the network-side device and used to indicate specific operation content to be performed in the interference cancellation operation.

Correspondingly, the continuing to apply the received interference cancellation parameter to perform an interference cancellation operation may include:

determining, according to the indication information included in the interference cancellation indication information and used to indicate the specific operation content to be performed in the interference cancellation operation, the specific operation content to be performed in the interference cancellation operation, and continuing to apply the received interference cancellation parameter to perform the corresponding interference cancellation operation according to the determined specific operation content to be performed in the interference cancellation operation.

Further, similar to the process described in step 101, when or after the continuing to apply the received interference cancellation parameter to perform an interference cancellation operation, the method may further include:

reporting, to the network-side device, an interference cancellation result obtained by continuing to apply the received interference cancellation parameter to perform the interference cancellation operation.

It should be noted that, before the reporting, to the network-side device, an interference cancellation result obtained by continuing to apply the received interference cancellation parameter to perform the interference cancellation operation, the method may further include:

receiving an interference cancellation result reporting instruction delivered by the network-side device, where the interference cancellation result reporting instruction may refer to instruction information used to instruct the user terminal to report the interference cancellation result obtained by continuing to apply the received interference cancellation parameter to perform the interference cancellation operation.

Correspondingly, the reporting, to the network-side device, an interference cancellation result obtained by continuing to apply the received interference cancellation parameter to perform the interference cancellation operation may include:

reporting, to the network-side device according to the interference cancellation result reporting instruction delivered by the network-side device, the interference cancellation result obtained by continuing to apply the received interference cancellation parameter to perform the interference cancellation operation.

Certainly, it should be noted that, the user terminal may further actively report, to the network-side device when or after the received interference cancellation parameter continues to be applied to perform the interference cancellation operation, the interference cancellation result obtained by continuing to apply the received interference cancellation parameter to perform the interference cancellation operation. This is not described in this embodiment of the present invention.

Further, it should be noted that, similar to the process described in step 101, before the reporting, to the network-side device, an interference cancellation result obtained by continuing to apply the received interference cancellation parameter to perform the interference cancellation operation, or before the receiving an interference cancellation result reporting instruction delivered by the network-side device and used to instruct the user terminal to report the interference cancellation result obtained by continuing to apply the received interference cancellation parameter to perform the interference cancellation operation, the method may further include:

transmitting, to the network-side device, indication information used to indicate that the corresponding interference cancellation result is available, so that the network-side device may deliver the corresponding interference cancellation result reporting instruction to the user terminal according to the indication information used to indicate that the corresponding interference cancellation result is available.

Certainly, it should be noted that, if it is determined that the interference cancellation result obtained by continuing to apply the received interference cancellation parameter to perform the interference cancellation operation is unavailable, the user terminal may transmit, to the network-side device, indication information used to indicate that the corresponding interference cancellation result is unavailable, so as to reduce signaling consumption caused when the network-side device still delivers the corresponding interference cancellation result reporting instruction to the user terminal and the user terminal still reports the corresponding interference cancellation result to the network-side device.

Further, similar to the process described in step 101, when or after the continuing to apply the received interference cancellation parameter to perform an interference cancellation operation, the method may further include:

if it is determined that an interference cancellation effect obtained by continuing to apply the received interference cancellation parameter to perform the interference cancellation operation does not meet a specified condition, releasing or no longer applying the interference cancellation parameter, so as to reduce processing complexity of the user terminal; or if instruction information delivered by the network-side device and used to instruct the user terminal to release or no longer apply the interference cancellation parameter is received, releasing or no longer applying the interference cancellation parameter; or if an updated interference cancellation parameter delivered by the network-side device is received, performing the corresponding interference cancellation operation according to the received updated interference cancellation parameter.

Further, it should be noted that, in this embodiment of the present invention, the method may further include the following step:

in the process of performing cell reestablishment or cell handover, continuing to apply any one or more of the following dedicated radio resource configuration parameters according to a specified dedicated radio resource configuration parameter application rule or third instruction information delivered by the network-side device, or releasing or no longer applying any one or more of the following dedicated radio resource configuration parameters:

an SRB configuration parameter, a DRB configuration parameter, a MAC layer configuration parameter, an SPS configuration parameter, or a dedicated physical layer configuration parameter, or the like.

Further, it should be noted that, the dedicated radio resource configuration parameter application rule or the third instruction information may be transmitted by the network-side device to the user terminal based on a dedicated message, a broadcast message, an RRC message, a MAC layer message, or a physical layer message, or the like. In addition, the dedicated radio resource configuration parameter application rule may also be preset and fixed in the protocol as a default rule. This is not described in this embodiment of the present invention. It should be noted that, by configuring the corresponding dedicated radio resource configuration parameter application rule or the instruction information, any one or more of the radio resource configuration parameters may be applied more effectively, so that an effect of improving radio resource usage efficiency, reducing signaling overheads, and improving user experience is achieved.

Furthermore, it should be noted that, in the process of performing cell reestablishment or cell handover, the step of determining whether to continue to apply any one or more of the dedicated radio resource configuration parameters may be a step independent of step 101 and step 102 in this embodiment of the present invention, that is, regardless of whether the interference cancellation parameter is configured and applied, and regardless of whether the previous interference cancellation parameter continues to be applied in the process of performing cell reestablishment or cell handover, the step of determining whether to continue to apply any one or more of the dedicated radio resource configuration parameters may be performed. This is also not described in this embodiment of the present invention.

Embodiment 3 of the present invention provides an interference cancellation method. In the technical solution of Embodiment 3 of the present invention, in a process of performing cell reestablishment or cell handover, for any interference cancellation parameter previously received from a network-side device, a user terminal can continue to apply the interference cancellation parameter to perform an interference cancellation operation according to a specified first interference cancellation parameter application rule or first instruction information delivered by the network-side device, or release or no longer apply the interference cancellation parameter. In this way, a currently existing problem that a user terminal cannot know how to process a previously received interference cancellation parameter in a process of performing cell reestablishment or cell handover can be resolved, and further, an objective of improving an interference cancellation effect can be achieved.

Embodiment 4

Figure 6:
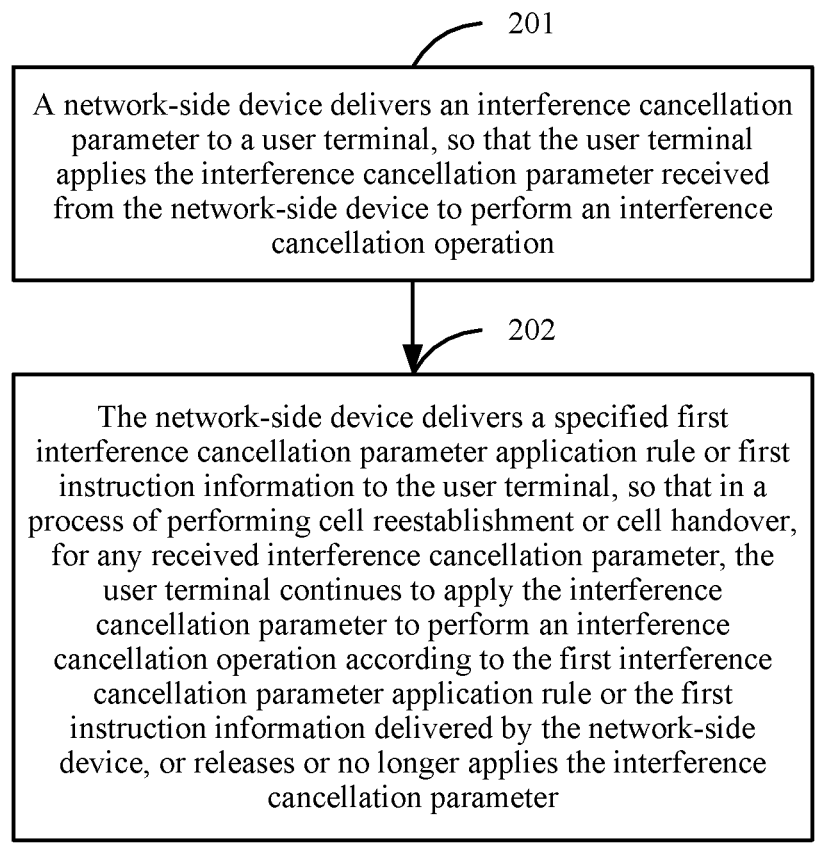
FIG. 6 is a schematic flowchart of an interference cancellation method according to Embodiment 4 of the present invention.

Embodiment 4 of the present invention uses an example in which an execution entity is a network-side device (for example, the network-side device described in Embodiment 2), to further describe the interference cancellation method in Embodiment 3 of the present invention. As shown in FIG. 6, FIG. 6 is a schematic flowchart of the interference cancellation method according to Embodiment 4 of the present invention. The interference cancellation method may include the following steps:

Step 201: A network-side device delivers an interference cancellation parameter to a user terminal, so that the user terminal applies the interference cancellation parameter received from the network-side device, to perform an interference cancellation operation.

Specifically, the interference cancellation parameter may be generally obtained by the network-side device from a neighboring network-side device or a core network. This is not described in this embodiment of the present invention.

That is, in this embodiment of the present invention, before the delivering an interference cancellation parameter to the user terminal, the method may further include:

obtaining the corresponding interference cancellation parameter from a neighboring network-side device or a core network. The neighboring network-side device is a network-side device that provides a service for a neighboring cell of a serving cell in which the user terminal is located. It may be understood that, the neighboring network-side device and the network-side device may be a same network-side device. This is also not described in this embodiment of the present invention.

Further, the interference cancellation parameter delivered by the network-side device to the user terminal may include at least one or more of the following parameters:

a cell identity of the neighboring cell of the serving cell in which the user terminal is located, pilot information of the neighboring cell of the serving cell in which the user terminal is located, a modulation mode of the neighboring cell of the serving cell in which the user terminal is located, a coding mode of the neighboring cell of the serving cell in which the user terminal is located, a transmission mode of the neighboring cell of the serving cell in which the user terminal is located, a precoding matrix of the neighboring cell of the serving cell in which the user terminal is located, a coding rate of the neighboring cell of the serving cell in which the user terminal is located, a power parameter of the neighboring cell of the serving cell in which the user terminal is located, MBSFN configuration information of the neighboring cell of the serving cell in which the user terminal is located, information about a virtual cell ID and an nSCID of the neighboring cell of the serving cell in which the user terminal is located, a TDD configuration parameter used by the neighboring cell of the serving cell in which the user terminal is located, first decision information of the neighboring cell of the serving cell in which the user terminal is located, second decision information of the neighboring cell of the serving cell in which the user terminal is located, third decision information of the neighboring cell of the serving cell in which the user terminal is located, or start symbol information of a PDSCH of the neighboring cell of the serving cell in which the user terminal is located, or the like, where for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

Further, that the network-side device delivers an interference cancellation parameter to a user terminal, so that the user terminal applies the interference cancellation parameter received from the network-side device, to perform an interference cancellation operation, may include:

delivering the interference cancellation parameter to the user terminal, so that the user terminal applies the interference cancellation parameter to perform interference cancellation on a control channel of the serving cell of the user terminal; or so that the user terminal applies the interference cancellation parameter to perform interference cancellation on a pilot channel of the serving cell of the user terminal; or so that the user terminal applies the interference cancellation parameter to perform interference cancellation on a data channel of the serving cell of the user terminal; or so that the user terminal applies the interference cancellation parameter to perform interference cancellation on a synchronization channel of the serving cell of the user terminal; or so that the user terminal applies the interference cancellation parameter to perform a measurement, or the like. This is not described in this embodiment of the present invention.

Further, when or after the delivering an interference cancellation parameter to the user terminal, the method may further include: delivering, to the user terminal, indication information used to indicate an effective duration of each interference cancellation parameter.

Correspondingly, that the user terminal applies the interference cancellation parameter received from the network-side device, to perform an interference cancellation operation may include:

for any received interference cancellation parameter, if it is determined, according to an effective duration of the interference cancellation parameter and matching the interference cancellation parameter, that a forthcoming process of applying the interference cancellation parameter to perform an interference cancellation operation occurs within the effective duration of the interference cancellation parameter, the user terminal applies the interference cancellation parameter to perform the interference cancellation operation.

Further, when or after the delivering an interference cancellation parameter to the user terminal (or before the user terminal applies the received interference cancellation parameter to perform an interference cancellation operation), the method may further include:

delivering, to the user terminal, indication information used to indicate specific operation content to be performed in the interference cancellation operation.

Correspondingly, that the user terminal applies the interference cancellation parameter received from the network-side device, to perform an interference cancellation operation may include:

the user terminal determines, according to the indication information included in the interference cancellation indication information and used to indicate the specific operation content to be performed in the interference cancellation operation, the specific operation content to be performed in the interference cancellation operation, and applies the received interference cancellation parameter to perform the corresponding interference cancellation operation according to the determined specific operation content to be performed in the interference cancellation operation.

Further, after the user terminal applies the interference cancellation parameter received from the network-side device, to perform an interference cancellation operation, the method may further include:

receiving an interference cancellation result obtained by applying the received interference cancellation parameter to perform the interference cancellation operation and reported by the user terminal. The interference cancellation result may include at least one or more of the following information: identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation, or the like. The information about the interference cancellation effect corresponding to the interference cancellation operation may be information about a qualitative parameter such as good or poor, or may be information about a quantitative parameter such as a percentage. This is not limited in this embodiment of the present invention.

Further, before the receiving an interference cancellation result reported by the user terminal, the method may further include: delivering a corresponding interference cancellation result reporting instruction to the user terminal, so that the user terminal reports, to the network-side device, the interference cancellation result obtained by applying the received interference cancellation parameter to perform the interference cancellation operation.

Further, before the delivering a corresponding interference cancellation result reporting instruction to the user terminal, the method may further include: receiving indication information transmitted by the user terminal and used to indicate that the interference cancellation result is available, so that the corresponding interference cancellation result reporting instruction can be delivered to the user terminal according to the indication information used to indicate that the interference cancellation result is available.

Further, it should be noted that, after the receiving an interference cancellation result reported by the user terminal, the method may further include: if it is determined that the interference cancellation effect obtained by the user terminal by applying the received interference cancellation parameter to perform the interference cancellation operation does not meet a specified condition, delivering, to the user terminal, instruction information used to instruct the user terminal to release or no longer apply the interference cancellation parameter, so that the user terminal releases or no longer applies the interference cancellation parameter; or delivering an updated interference cancellation parameter to the user terminal, so that the user terminal performs the corresponding interference cancellation operation according to the updated interference cancellation parameter.

Further, it should be noted that, when or after the delivering an interference cancellation parameter to the user terminal, the method may further include:

delivering a specified second interference cancellation parameter application rule or second instruction information to the user terminal, so that when the user terminal receives an RRC message delivered by the network-side device and determines that the RRC message does not carry the corresponding interference cancellation parameter, the user terminal continues to apply the previously received interference cancellation parameter according to the second interference cancellation parameter application rule or the second instruction information, or releases or no longer applies the previously received interference cancellation parameter. The second interference cancellation parameter application rule or the second instruction information may be transmitted by the network-side device to the user terminal based on a dedicated message, a broadcast message, an RRC message, a MAC layer message, or a physical layer message, or the like. This is not described in this embodiment of the present invention.

Further, it should be noted that, in this embodiment of the present invention, because the user terminal may exchange information with the network-side device based on at least one or more of a dedicated message, a broadcast message, an RRC message, a MAC layer message, or a physical layer message, the indication information used to indicate the effective duration of each interference cancellation parameter, or the indication information used to indicate the specific operation content to be performed in the interference cancellation operation, or the interference cancellation result reporting instruction, or the instruction information used to instruct the user terminal to release or no longer apply the interference cancellation parameter, or the like may be transmitted by the network-side device to the user terminal based on a dedicated message, a broadcast message, an RRC message, a MAC layer message, or a physical layer message, or the like. Similarly, the indication information used to indicate that the interference cancellation result is available, or the indication information used to indicate that the interference cancellation result is unavailable, or the like may be transmitted by the user terminal to the network-side device based on a dedicated message, a broadcast message, an RRC message, a MAC layer message, or a physical layer message, or the like. This is not described in this embodiment of the present invention.

Step 202: The network-side device delivers a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter.

Specifically, the first interference cancellation parameter application rule may include any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, continuing to apply the interference cancellation parameter to perform the interference cancellation operation.

Correspondingly, the delivering a first interference cancellation parameter application rule to the user terminal, so that in a process of performing cell reestablishment or cell handover, for any received interference cancellation parameter, the user terminal continues to apply the interference cancellation parameter to perform an interference cancellation operation according to the first interference cancellation parameter application rule delivered by the network-side device, or releases or no longer applies the interference cancellation parameter, may include:

delivering the first interference cancellation parameter application rule to the user terminal, so that in the process of performing cell reestablishment or cell handover, the user terminal continues to apply the received interference cancellation parameter to perform the interference cancellation operation; or so that in the process of performing cell reestablishment or cell handover, if it is determined that reestablishment or handover to the original serving cell of the user terminal is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the neighboring cell of the original serving cell of the user terminal is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the target serving cell of the user terminal is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the cell for which the received interference cancellation parameter is configured is required, the user terminal continues to apply the received interference cancellation parameter to perform the interference cancellation operation, or else, releases or no longer applies the interference cancellation parameter; or so that in the process of performing cell reestablishment or cell handover, if it is determined that reestablishment or handover to the neighboring cell of the cell for which the received interference cancellation parameter is configured is required, the user terminal continues to apply the received interference cancellation parameter to perform the interference cancellation operation, or else, releases or no longer applies the interference cancellation parameter; or so that in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, the user terminal continues to apply the interference cancellation parameter to perform the interference cancellation operation, or else, releases or no longer applies the interference cancellation parameter.

It should be noted that, generally, the first interference cancellation parameter application rule may be transmitted by the network-side device to the user terminal based on a dedicated message, a broadcast message, an RRC message, a MAC layer message, or a physical layer message, or the like. This is not described in this embodiment of the present invention.

In addition, as described in the foregoing step 201, for the any interference cancellation parameter received by the user terminal, generally, the effective duration of the interference cancellation parameter is also transmitted by the network-side device to the user terminal, for example, may be transmitted by the network-side device to the user terminal based on a dedicated message, a broadcast message, an RRC message, a MAC layer message, or a physical layer message, or the like when or after the interference cancellation parameter is delivered to the user terminal. In addition, for any two or more interference cancellation parameters of a same cell or different cells, effective durations of the interference cancellation parameters and respectively corresponding to the any two or more interference cancellation parameters may be the same or different from each other. This is not limited in this embodiment of the present invention.

Furthermore, the neighboring cell of the original serving cell of the user terminal is generally determined by using a neighboring cell list of the original serving cell of the user terminal; and the neighboring cell of the other cell for which the interference cancellation parameter is configured is generally determined by using a neighboring cell list of the other cell for which the interference cancellation parameter is configured. In addition, the neighboring cell list of the original serving cell of the user terminal and the neighboring cell list of the other cell for which the interference cancellation parameter is configured are also generally transmitted by the network-side device to the terminal, for example, may be transmitted by the network-side device to the user terminal based on a dedicated message, a broadcast message, an RRC message, a MAC layer message, or a physical layer message, or the like when or after the interference cancellation parameter is delivered to the user terminal. This is also not limited in this embodiment of the present invention.

Further, it should be noted that, the foregoing execution process is described by using the first interference cancellation parameter application rule to indicate in which cases the interference cancellation parameter may continue to be applied. It may be understood that, the first interference cancellation parameter application rule may be further set for indicating in which cases the corresponding interference cancellation parameter may be released or no longer applied. In this case, the first interference cancellation parameter application rule may specifically include any one or more of the following rules:

releasing or no longer applying the received interference cancellation parameter in the process of performing cell reestablishment or cell handover; or if it is determined that the cell to which reestablishment or handover is required is not the original serving cell of the user terminal, in the process of performing cell reestablishment or cell handover, releasing or no longer applying the received interference cancellation parameter; or if it is determined that the cell to which reestablishment or handover is required is not the neighboring cell of the original serving cell of the user terminal, in the process of performing cell reestablishment or cell handover, releasing or no longer applying the received interference cancellation parameter; or if it is determined that the cell to which reestablishment or handover is required is not the target serving cell of the user terminal, in the process of performing cell reestablishment or cell handover, releasing or no longer applying the received interference cancellation parameter; or if it is determined that the cell to which reestablishment or handover is required is not the cell for which the received interference cancellation parameter is configured, in the process of performing cell reestablishment or cell handover, releasing or no longer applying the received interference cancellation parameter; or if it is determined that the cell to which reestablishment or handover is required is not the neighboring cell of the cell for which the received interference cancellation parameter is configured, in the process of performing cell reestablishment or cell handover, releasing or no longer applying the received interference cancellation parameter; or for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, releasing or no longer applying the received interference cancellation parameter.

Correspondingly, the delivering a first interference cancellation parameter application rule to the user terminal, so that in a process of performing cell reestablishment or cell handover, for any received interference cancellation parameter, the user terminal continues to apply the interference cancellation parameter to perform an interference cancellation operation according to the first interference cancellation parameter application rule delivered by the network-side device, or releases or no longer applies the interference cancellation parameter, may include:

delivering the first interference cancellation parameter application rule to the user terminal, so that in the process of performing cell reestablishment or cell handover, the user terminal releases or not longer applies the received interference cancellation parameter; or so that in the process of performing cell reestablishment or cell handover, if it is determined that the cell to which reestablishment or handover is required is not the original serving cell of the user terminal, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the neighboring cell of the original serving cell of the user terminal, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the target serving cell of the user terminal, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the cell for which the received interference cancellation parameter is configured, the user terminal releases or no longer applies the received interference cancellation parameter, or else, continues to apply the received interference cancellation parameter to perform the interference cancellation operation; or so that in the process of performing cell reestablishment or cell handover, if it is determined that the cell to which reestablishment or handover is required is not the neighboring cell of the cell for which the received interference cancellation parameter is configured, the user terminal releases or no longer applies the received interference cancellation parameter, or else, continues to apply the received interference cancellation parameter to perform the interference cancellation operation; or so that for the any received interference cancellation parameter, if it is determined, according to the specified effective duration, matching the interference cancellation parameter, of the interference cancellation parameter, that the process of cell reestablishment or cell handover occurs beyond the effective duration of the interference cancellation parameter, the user terminal releases or no longer applies the received interference cancellation parameter, or else, continues to apply the received interference cancellation parameter to perform the interference cancellation operation.

Further, the first instruction information may include instruction information used to instruct the user terminal to continue to apply one or more interference cancellation parameters in the received interference cancellation parameters in the process of performing cell reestablishment or cell handover, or may include instruction information used to instruct the user terminal to release or no longer apply one or more interference cancellation parameters in the received interference cancellation parameters in the process of performing cell reestablishment or cell handover.

Correspondingly, the delivering first instruction information to the user terminal, so that in a process of performing cell reestablishment or cell handover, for any received interference cancellation parameter, the user terminal continues to apply the interference cancellation parameter to perform an interference cancellation operation according to the first instruction information delivered by the network-side device, or releases or no longer applies the interference cancellation parameter, may include:

delivering the first instruction information to the user terminal, so that in the process of performing cell reestablishment or cell handover, for the any received interference cancellation parameter, if instruction information delivered by the network-side device and used to instruct the user terminal to continue to apply the interference cancellation parameter in the process of performing cell reestablishment or cell handover is received, the user terminal may continue to apply the interference cancellation parameter to perform the interference cancellation operation; or so that in the process of performing cell reestablishment or cell handover, for the any received interference cancellation parameter, if instruction information delivered by the network-side device and used to instruct the user terminal to release or no longer apply the interference cancellation parameter in the process of performing cell reestablishment or cell handover is received, the user terminal may release or no longer apply the interference cancellation parameter.

It should be noted that, for any two or more interference cancellation parameters, instruction information corresponding to the any two or more interference cancellation parameters and used to instruct the user terminal to continue to apply the corresponding interference cancellation parameters in the process of performing cell reestablishment or cell handover may be same instruction information or may be different instruction information. Preferably, to save network transmission resources and improve transmission efficiency, the instruction information corresponding to the any two or more interference cancellation parameters and used to instruct the user terminal to continue to apply the corresponding interference cancellation parameters in the process of performing cell reestablishment or cell handover may be generally the same instruction information. That is, the network-side device may indicate, by delivering the same instruction information to the user terminal, which interference cancellation parameters may continue to be applied in the process of performing cell reestablishment or cell handover. For example, the same instruction information is used to instruct the user terminal to continue to apply all of the previously configured interference cancellation parameters in the process of performing cell reestablishment or cell handover. This is not described in this embodiment of the present invention.

Similarly, for the any two or more interference cancellation parameters, instruction information corresponding to the any two or more interference cancellation parameters and used to instruct the user terminal to release or no longer apply the corresponding interference cancellation parameters in the process of performing cell reestablishment or cell handover may be same instruction information or may be different instruction information. This is also not described in this embodiment of the present invention.

Further, similar to the process described in step 201, that the user terminal continues to apply the interference cancellation parameter received from the network-side device, to perform an interference cancellation operation may include:

the user terminal continues to apply the interference cancellation parameter to perform interference cancellation on a control channel of the serving cell of the user terminal; or the user terminal continues to apply the interference cancellation parameter to perform interference cancellation on a pilot channel of the serving cell of the user terminal; or the user terminal continues to apply the interference cancellation parameter to perform interference cancellation on a data channel of the serving cell of the user terminal; or the user terminal continues to apply the interference cancellation parameter to perform interference cancellation on a synchronization channel of the serving cell of the user terminal; or the user terminal continues to apply the interference cancellation parameter to perform a measurement, or the like.

Correspondingly, similar to the process described in step 201, before the user terminal continues to apply the received interference cancellation parameter to perform an interference cancellation operation, the method may further include:

delivering, to the user terminal, indication information used to indicate specific operation content to be performed in the interference cancellation operation.

Correspondingly, that the user terminal applies the interference cancellation parameter received from the network-side device, to perform an interference cancellation operation may include:

the user terminal determines, according to the indication information included in the interference cancellation indication information and used to indicate the specific operation content to be performed in the interference cancellation operation, the specific operation content to be performed in the interference cancellation operation, and applies the received interference cancellation parameter to perform the corresponding interference cancellation operation according to the determined specific operation content to be performed in the interference cancellation operation.

Further, similar to the process described in step 201, when or after the user terminal continues to apply the received interference cancellation parameter to perform an interference cancellation operation, the method may further include:

receiving an interference cancellation result obtained by continuing to apply the received interference cancellation parameter to perform the interference cancellation operation and reported by the user terminal.

It should be noted that, before the receiving an interference cancellation result obtained by continuing to apply the received interference cancellation parameter to perform the interference cancellation operation and reported by the user terminal, the method may further include:

delivering a corresponding interference cancellation result reporting instruction to the user terminal, so that the user terminal reports, to the network-side device according to the interference cancellation result reporting instruction delivered by the network-side device, the interference cancellation result obtained by continuing to apply the received interference cancellation parameter to perform the interference cancellation operation.

Further, before the delivering a corresponding interference cancellation result reporting instruction to the user terminal, the method may further include:

receiving indication information transmitted by the user terminal and used to indicate that the interference cancellation result obtained by continuing to apply the received interference cancellation parameter to perform the interference cancellation operation is available, so that the corresponding interference cancellation result reporting instruction can be delivered to the user terminal according to the indication information used to indicate that the interference cancellation result is available.

Further, it should be noted that, similar to the process described in step 201, after the receiving an interference cancellation result obtained by continuing to apply the received interference cancellation parameter to perform the interference cancellation operation and reported by the user terminal, the method may further include:

if it is determined that an interference cancellation effect obtained by the user terminal by continuing to apply the received interference cancellation parameter to perform the interference cancellation operation does not meet a specified condition, delivering, to the user terminal, instruction information used to instruct the user terminal to release or no longer apply the interference cancellation parameter, so that the user terminal releases or no longer applies the interference cancellation parameter; or delivering an updated interference cancellation parameter to the user terminal, so that the user terminal performs the corresponding interference cancellation operation according to the updated interference cancellation parameter.

Further, in this embodiment of the present invention, the method may further include:

delivering a specified dedicated radio resource configuration parameter application rule or third instruction information to the user terminal, so that in the process of performing cell reestablishment or cell handover, the user terminal continues to apply any one or more of the following dedicated radio resource configuration parameters according to the dedicated radio resource configuration parameter application rule or the third instruction information, or releases or no longer applies any one or more of the following dedicated radio resource configuration parameters: an SRB configuration parameter, a DRB configuration parameter, a MAC layer configuration parameter, an SPS configuration parameter, or a dedicated physical layer configuration parameter.

It should be noted that, the dedicated radio resource configuration parameter application rule or the third instruction information may be transmitted by the network-side device to the user terminal based on a dedicated message, a broadcast message, an RRC message, a MAC layer message, or a physical layer message, or the like. Furthermore, it should be noted that, the step of delivering a specified dedicated radio resource configuration parameter application rule or third instruction information to the user terminal may be a step independent of step 202 in this embodiment of the present invention, that is, regardless of whether the specified first interference cancellation parameter application rule or the first instruction information is delivered to the user terminal, the step of delivering a specified dedicated radio resource configuration parameter application rule or third instruction information to the user terminal may be performed. This is also not described in this embodiment of the present invention.

Embodiment 4 of the present invention provides an interference cancellation method. In the technical solution of Embodiment 4 of the present invention, a network-side device may deliver an interference cancellation parameter to a user terminal, so that the user terminal applies the interference cancellation parameter received from the network-side device, to perform an interference cancellation operation, and the network-side device may further deliver a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter. In this way, a currently existing problem that a user terminal cannot know how to process a previously received interference cancellation parameter in a process of performing cell reestablishment or cell handover can be resolved, and further, an objective of improving an interference cancellation effect can be achieved.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A user terminal, comprising:
a receiver, to receive an interference cancellation parameter delivered by a network-side device, or further to receive first instruction information delivered by a network-side device; and
a processor, to apply the interference cancellation parameter received by the receiver, to perform an interference cancellation operation, and in a process of performing cell reestablishment or cell handover, for any received interference cancellation parameter, continue to apply the interference cancellation parameter to perform an interference cancellation operation according to a specified first interference cancellation parameter application rule or the first instruction information received by the receiver, or release or no longer apply the interference cancellation parameter,
wherein the interference cancellation parameter received by the receiver comprises at least one or more of the following parameters:
a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, multicast/broadcast single frequency network (MBSFN) configuration information of a neighboring cell of a serving cell in which the user terminal is located, information about a virtual cell identity (virtual cell ID) and a scrambling identifier indication bit nSCID of a neighboring cell of a serving cell in which the user terminal is located, a time division duplex (TDD) configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a physical downlink shared channel (PDSCH) of a neighboring cell of a serving cell in which the user terminal is located, wherein for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

2. The user terminal according to claim 1, wherein the first interference cancellation parameter application rule comprises any one or more of the following rules:
    in the process of performing cell reestablishment or cell handover, continuing to apply the received interference cancellation parameter to perform the interference cancellation operation; or
    if it is determined that reestablishment or handover to the original serving cell of the user terminal is required, in the process of performing cell reestablishment or cell handover, continuing to apply the received interference cancellation parameter to perform the interference cancellation operation; or
    if it is determined that reestablishment or handover to the neighboring cell of the original serving cell of the user terminal is required, in the process of performing cell reestablishment or cell handover, continuing to apply the received interference cancellation parameter to perform the interference cancellation operation; or
    if it is determined that reestablishment or handover to a target serving cell of the user terminal is required, in the process of performing cell reestablishment or cell handover, continuing to apply the received interference cancellation parameter to perform the interference cancellation operation; or
    if it is determined that reestablishment or handover to a cell for which the received interference cancellation parameter is configured is required, in the process of performing cell reestablishment or cell handover, continuing to apply the received interference cancellation parameter to perform the interference cancellation operation; or
    if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or
    for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation; and
    the processor is to: in the process of performing cell reestablishment or cell handover, continue to apply the received interference cancellation parameter to perform the interference cancellation operation; or
    to, in the process of performing cell reestablishment or cell handover, if it is determined that reestablishment or handover to the original serving cell of the user terminal is required, continue to apply the received interference cancellation parameter to perform the interference cancellation operation, or else, release or no longer apply the interference cancellation parameter; or
    to, in the process of performing cell reestablishment or cell handover, if it is determined that reestablishment or handover to the neighboring cell of the original serving cell of the user terminal is required, continue to apply the received interference cancellation parameter to perform the interference cancellation operation, or else, release or no longer apply the interference cancellation parameter; or
    to, in the process of performing cell reestablishment or cell handover, if it is determined that reestablishment or handover to the target serving cell of the user terminal is required, continue to apply the received interference cancellation parameter to perform the interference cancellation operation, or else, release or no longer apply the interference cancellation parameter; or
    to, in the process of performing cell reestablishment or cell handover, if it is determined that reestablishment or handover to the cell for which the received interference cancellation parameter is configured is required, continue to apply the received interference cancellation parameter to perform the interference cancellation operation, or else, release or no longer apply the interference cancellation parameter; or
    to, in the process of performing cell reestablishment or cell handover, if it is determined that reestablishment or handover to the neighboring cell of the cell for which the received interference cancellation parameter is configured is required, continue to apply the received interference cancellation parameter to perform the interference cancellation operation, or else, release or no longer apply the interference cancellation parameter; or
    to, in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continue to apply the interference cancellation parameter to perform the interference cancellation operation, or else, release or no longer apply the interference cancellation parameter.

3. The user terminal according to claim 1, wherein the first instruction information comprises instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover; and
    the processor is to: in the process of performing cell reestablishment or cell handover, for the any received interference cancellation parameter, if it is determined that instruction information delivered by the network-side device and used to instruct the user terminal to continue to apply the interference cancellation parameter in the process of performing cell reestablishment or cell handover is received, continue to apply the interference cancellation parameter to perform the interference cancellation operation; or if it is determined that instruction information delivered by the network-side device and used to instruct the user terminal to release or no longer apply the interference cancellation parameter in the process of performing cell reestablishment or cell handover is received, release or no longer apply the interference cancellation parameter.

4. The user terminal according to claim 1, wherein the processor is to apply the received interference cancellation parameter to perform any one or more of the following operations:
   applying the received interference cancellation parameter to perform interference cancellation on a control channel of the serving cell of the user terminal, wherein the control channel comprises at least any one or more of a physical downlink control channel (PDCCH), an enhanced physical downlink control channel (EPDCCH), or a physical hybrid automatic repeat request indicator channel (PHICH); or
   applying the received interference cancellation parameter to perform interference cancellation on a pilot channel of the serving cell of the user terminal, wherein the pilot channel comprises at least any one or more of a cell-specific reference signal (CRS), a channel state information-reference signal (CSI-RS), a discovery reference signal (DRS), a positioning reference signal (PRS), or a demodulation reference signal (DMRS); or
   applying the received interference cancellation parameter to perform interference cancellation on a data channel of the serving cell of the user terminal, wherein the data channel comprises at least a physical downlink shared channel (PDSCH); or
   applying the received interference cancellation parameter to perform interference cancellation on a synchronization channel of the serving cell of the user terminal, wherein the synchronization channel comprises at least a primary synchronization signal (PSS) and/or a secondary synchronization signal (SSS); or
   applying the received interference cancellation parameter to perform a measurement, wherein the measurement comprises at least one or more of a radio resource management (RRM) measurement, a radio link management (RLM) measurement, a channel quality indicator (CQI) measurement, or a channel state information (CSI) measurement.

5. A network-side device, comprising a transmitter and a memory that is to store various types of application program code required when the network-side device performs a corresponding operation, wherein
   the transmitter is to: deliver an interference cancellation parameter to a user terminal, so that the user terminal applies the interference cancellation parameter received from the network-side device, to perform an interference cancellation operation; and
   deliver a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter,
   wherein the interference cancellation parameter delivered by the transmitter to the user terminal comprises at least one or more of the following parameters:
   a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, multicast/broadcast single frequency network (MBSFN) configuration information of a neighboring cell of a serving cell in which the user terminal is located, information about a virtual cell identity (virtual cell ID) and a scrambling identifier indication bit nSCID of a neighboring cell of a serving cell in which the user terminal is located, a time division duplex (TDD) configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a physical downlink shared channel (PDSCH) of a neighboring cell of a serving cell in which the user terminal is located, wherein for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

6. The network-side device according to claim 5, wherein the first interference cancellation parameter application rule comprises any one or more of the following rules:
   in the process of performing cell reestablishment or cell handover, continuing to apply the received interference cancellation parameter to perform the interference cancellation operation; or
   if it is determined that reestablishment or handover to the original serving cell of the user terminal is required, in the process of performing cell reestablishment or cell handover, continuing to apply the received interference cancellation parameter to perform the interference cancellation operation; or
   if it is determined that reestablishment or handover to the neighboring cell of the original serving cell of the user terminal is required, in the process of performing cell reestablishment or cell handover, continuing to apply the received interference cancellation parameter to perform the interference cancellation operation; or
   if it is determined that reestablishment or handover to a target serving cell of the user terminal is required, in the process of performing cell reestablishment or cell handover, continuing to apply the received interference cancellation parameter to perform the interference cancellation operation; or
   if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

7. The network-side device according to claim 5, wherein the first instruction information comprises instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover.

8. An interference cancellation method, comprising:
receiving, by a user terminal, an interference cancellation parameter delivered by a network-side device, and applying the received interference cancellation parameter to perform an interference cancellation operation; and in a process of performing cell reestablishment or cell handover, for any received interference cancellation parameter, continuing to apply the interference cancellation parameter to perform an interference cancellation operation according to a specified first interference cancellation parameter application rule or first instruction information delivered by the network-side device, or releasing or no longer applying the interference cancellation parameter, wherein the received interference cancellation parameter comprises at least one or more of the following parameters:

a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, multicast/broadcast single frequency network (MBSFN) configuration information of a neighboring cell of a serving cell in which the user terminal is located, information about a virtual cell identity (virtual cell ID) and a scrambling identifier indication bit nSCID of a neighboring cell of a serving cell in which the user terminal is located, a time division duplex (TDD) configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a physical downlink shared channel (PDSCH) of a neighboring cell of a serving cell in which the user terminal is located, wherein for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

9. The interference cancellation method according to claim 8, wherein the first interference cancellation parameter application rule comprises any one or more of the following rules:

in the process of performing cell reestablishment or cell handover, continuing to apply the received interference cancellation parameter to perform the interference cancellation operation; or if it is determined that reestablishment or handover to the original serving cell of the user terminal is required, in the process of performing cell reestablishment or cell handover, continuing to apply the received interference cancellation parameter to perform the interference cancellation operation; or if it is determined that reestablishment or handover to the neighboring cell of the original serving cell of the user terminal is required, in the process of performing cell reestablishment or cell handover, continuing to apply the received interference cancellation parameter to perform the interference cancellation operation; or if it is determined that reestablishment or handover to a target serving cell of the user terminal is required, in the process of performing cell reestablishment or cell handover, continuing to apply the received interference cancellation parameter to perform the interference cancellation operation; or if it is determined that reestablishment or handover to a cell for which the received interference cancellation parameter is configured is required, in the process of performing cell reestablishment or cell handover, continuing to apply the received interference cancellation parameter to perform the interference cancellation operation; or if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation; and the in a process of performing cell reestablishment or cell handover, for any received interference cancellation parameter, continuing to apply the interference cancellation parameter to perform an interference cancellation operation according to a specified first interference cancellation parameter application rule, or releasing or no longer applying the interference cancellation parameter, comprises:

in the process of performing cell reestablishment or cell handover, continuing to apply the received interference cancellation parameter to perform the interference cancellation operation; or in the process of performing cell reestablishment or cell handover, if it is determined that reestablishment or handover to the original serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the neighboring cell of the original serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the target serving cell of the user terminal is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the cell for which the received interference cancellation parameter is configured is required, continuing to apply the received interference cancellation parameter to perform the interference cancellation operation, or else, releasing or no longer applying the interference cancellation parameter; or in the process of performing cell reestablishment or cell handover, if it is determined that reestablishment or handover to the neighboring cell of the cell for which the received interference cancellation parameter is configured is required, continuing to apply the received interference cancellation parameter to perform the interference cancellation operation, or else, releasing or no longer applying the interference cancellation parameter; or in the process of performing cell reestablishment or cell handover, for the any received interference cancellation parameter, if it is determined, according to the specified effective duration, matching the interference cancellation parameter, of the interference cancellation parameter, that the process of cell reestablishment or cell handover occurs within the effective duration of the interference cancellation parameter, continuing to apply the interference cancellation parameter to perform the interference cancellation operation, or else, releasing or no longer applying the interference cancellation parameter.

10. The interference cancellation method according to claim 8, wherein the applying the received interference cancellation parameter to perform an interference cancellation operation comprises any one or more of the following operations:

applying the received interference cancellation parameter to perform interference cancellation on a control channel of the serving cell of the user terminal, wherein the control channel comprises at least any one or more of a physical downlink control channel (PDCCH), an enhanced physical downlink control channel (EPDCCH), or a physical hybrid automatic repeat request indicator channel (PHICH); or applying the received interference cancellation parameter to perform interference cancellation on a pilot channel of the serving cell of the user terminal, wherein the pilot channel comprises at least any one or more of a cell-specific reference signal (CRS), a channel state information-reference signal (CSI-RS), a discovery reference signal (DRS), a positioning reference signal (PRS), or a demodulation reference signal (DMRS); or applying the received interference cancellation parameter to perform interference cancellation on a data channel of the serving cell of the user terminal, wherein the data channel comprises at least a physical downlink shared channel (PDSCH); or applying the received interference cancellation parameter to perform interference cancellation on a synchronization channel of the serving cell of the user terminal, wherein the synchronization channel comprises at least a primary synchronization signal (PSS) and/or a secondary synchronization signal (SSS); or applying the received interference cancellation parameter to perform a measurement, wherein the measurement comprises at least one or more of a radio resource management (RRM) measurement, a radio link management (RLM) measurement, a channel quality indicator (CQI) measurement, or a channel state information (CSI) measurement.

11. The interference cancellation method according to claim 8, wherein when or after the applying the received interference cancellation parameter to perform an interference cancellation operation, the method further comprises:

reporting, to the network-side device, an interference cancellation result obtained by applying the received interference cancellation parameter to perform the interference cancellation operation.

12. The interference cancellation method according to claim 11, wherein the interference cancellation result comprises at least one or more of the following information:

identity information of the interference cancellation parameter applied in the interference cancellation operation, cell identity information corresponding to the interference cancellation parameter applied in the interference cancellation operation, information about the specific operation content of the interference cancellation operation, or information about an interference cancellation effect corresponding to the interference cancellation operation.

13. The interference cancellation method according to claim 12, wherein when or after the applying the received interference cancellation parameter to perform an interference cancellation operation, the method further comprises:
if it is determined that the interference cancellation effect obtained by applying the received interference cancellation parameter to perform the interference cancellation operation does not meet a specified condition, releasing or no longer applying the interference cancellation parameter; or
if instruction information delivered by the network-side device and used to instruct the user terminal to release or no longer apply the interference cancellation parameter is received, releasing or no longer applying the interference cancellation parameter; or
if an updated interference cancellation parameter delivered by the network-side device is received, performing the corresponding interference cancellation operation according to the received updated interference cancellation parameter.

14. An interference cancellation method, comprising:
delivering, by a network-side device, an interference cancellation parameter to a user terminal, so that the user terminal applies the interference cancellation parameter received from the network-side device, to perform an interference cancellation operation; and
delivering a specified first interference cancellation parameter application rule or first instruction information to the user terminal, so that in a process of performing cell reestablishment or cell handover, for any received interference cancellation parameter, the user terminal continues to apply the interference cancellation parameter to perform an interference cancellation operation according to the first interference cancellation parameter application rule or the first instruction information delivered by the network-side device, or releases or no longer applies the interference cancellation parameter,
wherein the interference cancellation parameter delivered by the network-side device to the user terminal comprises at least one or more of the following parameters:
a cell identity of a neighboring cell of a serving cell in which the user terminal is located, pilot information of a neighboring cell of a serving cell in which the user terminal is located, a modulation mode of a neighboring cell of a serving cell in which the user terminal is located, a coding mode of a neighboring cell of a serving cell in which the user terminal is located, a transmission mode of a neighboring cell of a serving cell in which the user terminal is located, a precoding matrix of a neighboring cell of a serving cell in which the user terminal is located, a coding rate of a neighboring cell of a serving cell in which the user terminal is located, a power parameter of a neighboring cell of a serving cell in which the user terminal is located, multicast/broadcast single frequency network (MBSFN) configuration information of a neighboring cell of a serving cell in which the user terminal is located, information about a virtual cell identity (virtual cell ID) and a scrambling identifier indication bit nSCID of a neighboring cell of a serving cell in which the user terminal is located, a time division duplex (TDD) configuration parameter used by a neighboring cell of a serving cell in which the user terminal is located, first decision information of a neighboring cell of a serving cell in which the user terminal is located, second decision information of a neighboring cell of a serving cell in which the user terminal is located, third decision information of a neighboring cell of a serving cell in which the user terminal is located, or start symbol information of a physical downlink shared channel (PDSCH) of a neighboring cell of a serving cell in which the user terminal is located, wherein for any neighboring cell, first decision information of the neighboring cell is used to indicate whether a TDD configuration used by the neighboring cell is consistent with a TDD configuration used by the serving cell, second decision information of the neighboring cell is used to indicate whether dynamic change information of the TDD configuration used by the neighboring cell is consistent with dynamic change information of the TDD configuration used by the serving cell, and third decision information of the neighboring cell is used to indicate whether the TDD configuration and an MBSFN configuration used by the neighboring cell are consistent with the TDD configuration and an MBSFN configuration used by the serving cell.

15. The interference cancellation method according to claim 14, wherein the first interference cancellation parameter application rule comprises any one or more of the following rules:
in the process of performing cell reestablishment or cell handover, continuing to apply the received interference cancellation parameter to perform the interference cancellation operation; or
if it is determined that reestablishment or handover to the original serving cell of the user terminal is required, in the process of performing cell reestablishment or cell handover, continuing to apply the received interference cancellation parameter to perform the interference cancellation operation; or
if it is determined that reestablishment or handover to the neighboring cell of the original serving cell of the user terminal is required, in the process of performing cell reestablishment or cell handover, continuing to apply the received interference cancellation parameter to perform the interference cancellation operation; or
if it is determined that reestablishment or handover to a target serving cell of the user terminal is required, in the process of performing cell reestablishment or cell handover, continuing to apply the received interference cancellation parameter to perform the interference cancellation operation; or
if it is determined that reestablishment or handover to a cell for which the received interference cancellation parameter is configured is required, in the process of performing cell reestablishment or cell handover, continuing to apply the received interference cancellation parameter to perform the interference cancellation operation; or
if it is determined that reestablishment or handover to a neighboring cell of a cell for which the received interference cancellation parameter is configured is required, in the process of performing cell reestablishment or cell handover, continuing to apply the received interference cancellation parameter to perform the interference cancellation operation; or
for the any received interference cancellation parameter, if it is determined, according to a specified effective duration, matching the interference cancellation parameter, of the interference cancellation parameter, that the process of cell reestablishment or cell handover occurs within the effective duration of the interference cancellation parameter, in the process of performing cell reestablishment or cell handover, continuing to apply the interference cancellation parameter to perform the interference cancellation operation.

16. The interference cancellation method according to claim 14, wherein the first instruction information comprises instruction information used to instruct the user terminal to continue to apply one or more interference cancellation parameters in the received interference cancellation parameters in the process of performing cell reestablishment or cell handover, or instruction information used to instruct the user terminal to release or no longer apply one or more interference cancellation parameters in the received interference cancellation parameters in the process of performing cell reestablishment or cell handover.

* * * * *